US012785307B2

(12) United States Patent
Kusaka

(10) Patent No.: US 12,785,307 B2
(45) Date of Patent: Nov. 3, 2026

(54) CONNECTOR ASSEMBLY

(71) Applicant: HIROSE ELECTRIC CO., LTD., Kanagawa (JP)

(72) Inventor: Kenta Kusaka, Kanagawa (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 387 days.

(21) Appl. No.: 18/675,229

(22) Filed: May 28, 2024

(65) Prior Publication Data

US 2024/0421519 A1 Dec. 19, 2024

(30) Foreign Application Priority Data

Jun. 14, 2023 (JP) ................................ 2023-097827

(51) Int. Cl.
*H01R 12/71* (2011.01)
*H01R 13/502* (2006.01)
*H01R 13/6581* (2011.01)

(52) U.S. Cl.
CPC ......... *H01R 12/716* (2013.01); *H01R 13/502* (2013.01); *H01R 13/6581* (2013.01)

(58) Field of Classification Search
CPC . H01R 12/716; H01R 13/502; H01R 13/6581
USPC ..................................................... 439/74, 66
See application file for complete search history.

(56) References Cited

U.S. PATENT DOCUMENTS 7,168,986 B1 * 1/2007 Peng .................... H01R 12/716 439/607.04
7,410,364 B2 * 8/2008 Kishi ................... H01R 12/716 439/570
8,562,379 B2 * 10/2013 Miyazaki ............. H01R 12/716 439/74
9,543,675 B1 * 1/2017 Takenaga ............... H01R 12/73
9,705,223 B2 * 7/2017 Miyazaki ............. H01R 12/716
10,084,265 B2 * 9/2018 Ozeki ................ H01R 13/6594
10,862,234 B2 * 12/2020 Horino .................... H01R 13/04
10,910,745 B2 * 2/2021 Hosoda ................ H01R 12/716
12,107,371 B2 * 10/2024 Kim ........................ H01R 12/73
12,149,015 B2 * 11/2024 Yokoyama ........... H01R 12/716
2020/0235506 A1 * 7/2020 Hosoda ................ H01R 13/631

(Continued)

FOREIGN PATENT DOCUMENTS

JP 2023026809 A 3/2023

*Primary Examiner* — Harshad C Patel
(74) *Attorney, Agent, or Firm* — RANKIN, HILL & CLARK LLP

(57) ABSTRACT

Provided is a connector assembly which includes a first connector; and a second connector, wherein the first connector has a plurality of first terminals, a conductive first shell, and an insulating first housing, the first shell has a first peripheral wall surrounding the first terminals, the first housing holds the first terminals and the first shell, the second connector has a plurality of second terminals, a conductive second shell, and an insulating second housing, the second shell has a second peripheral wall surrounding the second terminals, the second housing holds the second terminals and the second shell, the first housing is formed integrally with the first terminals and the first shell, the second housing is formed integrally with the second terminals and the second shell, and at least any one of the first peripheral wall or the second peripheral wall has a jointless structure over an entire circumference.

20 Claims, 16 Drawing Sheets

(56) References Cited

U.S. PATENT DOCUMENTS

| | | | | |
|---|---|---|---|---|
| 2022/0094112 | A1* | 3/2022 | Kim | H01R 12/707 |
| 2023/0046774 | A1 | 2/2023 | Yokoyama | |

* cited by examiner

CONNECTOR ASSEMBLY

CROSS-REFERENCE TO RELATED APPLICATION

This application claims priority from Japanese Patent Application No. 2023-097827 filed with the Japan Patent Office on Jun. 14, 2023, the entire content of which is hereby incorporated by reference.

BACKGROUND

1. Technical Field

The present disclosure relates to a connector assembly.

2. Related Art

A connector described in JP-A-2023-26809 is a board mounting type connector forming a connector assembly, and includes an insulating housing, a plurality of terminals arrayed and held on the housing, and a conductive shell. The housing is in an island shape, and is positioned in the shell. The shell is formed of a single metal plate, and includes a peripheral wall surrounding the housing, a bottom plate extending from a lower end on the side of mounting on a board to the inside of the peripheral wall, and a pair of support pieces extending from the bottom plate to support the housing. The shell is attached to the housing in such a manner that the shell is pushed down from above the housing holding the terminals and tip end portions of the pair of support pieces of the shell are each press-fitted in corresponding holes of the housing. The tip end portions of the pair of support pieces of the shell are bent after having stood along the corresponding side surfaces of the housing on the bottom plate of the shell.

As described above, in JP-A-2023-26809, the shell is attached to the housing by press-fitting. As a result, a clearance is formed between the shell and the housing, and the connector and therefore the connector assembly are increased in size. In recent years, there has been an increasing demand for size reduction in the connector and the connector assembly with, e.g., size reduction in a device. For example, it has been demanded that in a connector assembly used for a product targeted for the present disclosure, a width-direction length in a plane formed by a length direction which is a terminal array direction and a width direction perpendicular to the length direction is about 2 mm or less.

SUMMARY

A connector assembly according to an embodiment of the present disclosure is a connector assembly which includes a first connector; and a second connector fittable in the first connector, wherein the first connector has a plurality of first terminals, a conductive first shell, and an insulating first housing, the plurality of first terminals is arrayed along a length direction of the connector assembly, the first shell has a first peripheral wall surrounding the plurality of first terminals, the first housing holds the plurality of first terminals and the first shell, the second connector has a plurality of second terminals, a conductive second shell, and an insulating second housing, the plurality of second terminals is arrayed along the length direction, the second shell has a second peripheral wall surrounding the plurality of second terminals, the second housing holds the plurality of second terminals and the second shell, the first housing is formed integrally with the plurality of first terminals and the first shell, the second housing is formed integrally with the plurality of second terminals and the second shell, and at least any one of the first peripheral wall or the second peripheral wall has a jointless structure over an entire circumference.

DETAILED DESCRIPTION

Figure 1:
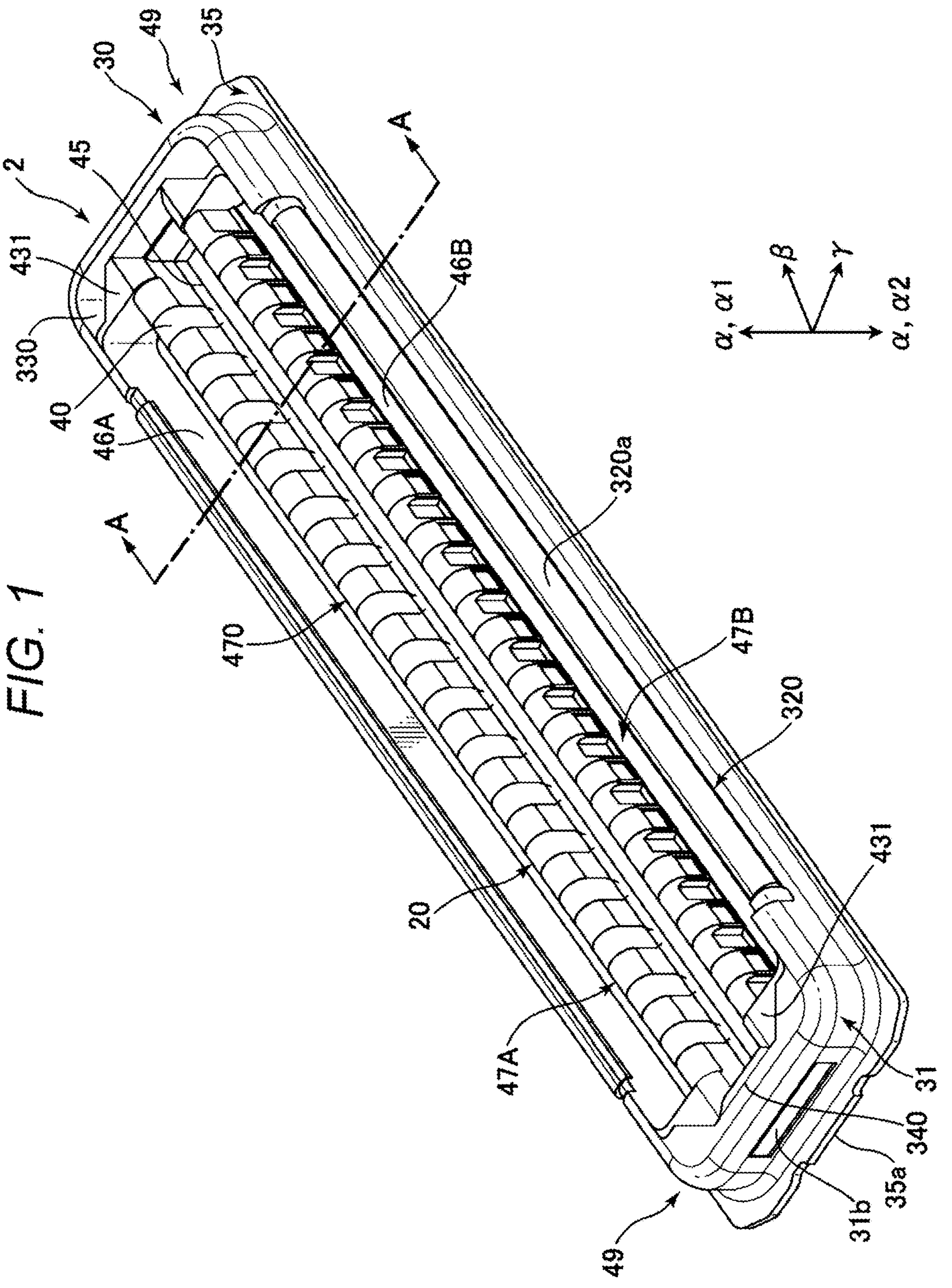
FIG. 1 is a perspective view of a plug connector of a connector assembly according to one preferred embodiment of the present disclosure.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An object of the present disclosure is to provide a smaller connector assembly having a shield function.

A connector assembly according to one aspect of the present disclosure is a connector assembly which includes a first connector; and a second connector fittable in the first connector, wherein the first connector has a plurality of first terminals, a conductive first shell, and an insulating first housing, the plurality of first terminals is arrayed along a length direction of the connector assembly, the first shell has a first peripheral wall surrounding the plurality of first terminals, the first housing holds the plurality of first terminals and the first shell, the second connector has a plurality of second terminals, a conductive second shell, and an insulating second housing, the plurality of second terminals is arrayed along the length direction, the second shell has a second peripheral wall surrounding the plurality of second terminals, the second housing holds the plurality of second terminals and the second shell, the first housing is formed integrally with the plurality of first terminals and the first shell, the second housing is formed integrally with the plurality of second terminals and the second shell, and at least any one of the first peripheral wall or the second peripheral wall has a jointless structure over an entire circumference.

According to the connector assembly of the present disclosure, the shield function can be more reliably obtained by the shell surrounding the plurality of terminals and having the peripheral wall with the jointless structure over the entire circumference. In addition, the plurality of terminals and the shell are formed integrally with the housing by insert molding, so that the connector assembly can be reduced in size.

According to the present disclosure, the smaller connector assembly having the shield function is provided.

Hereinafter, an exemplary embodiment for carrying out the present disclosure will be described in detail with reference to the drawings. Note that, e.g., the dimensions, shapes, and relative positions of components described in the embodiment below are arbitrary as long as these dimensions, shapes, and relative positions are not essential for the present disclosure and can be changed according to the configuration of a device to which the present disclosure is applied or various conditions. Moreover, the scope of the present disclosure is not limited to the embodiment specifically described below.

Figure 2:
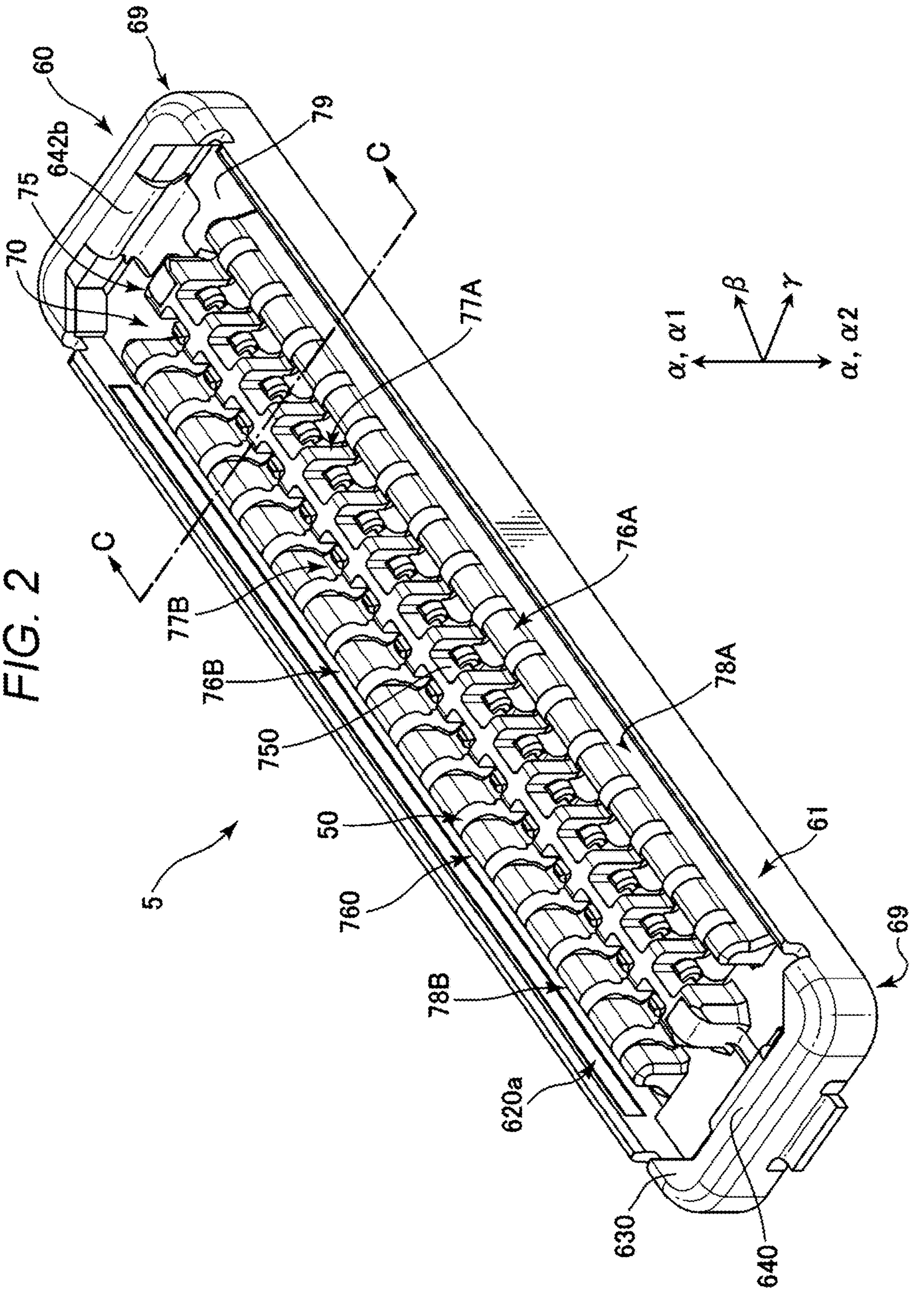
FIG. 2 is a perspective view of a receptacle connector of the connector assembly according to the preferred embodiment of the present disclosure.

FIGS. 1 and 2 show perspective views of a plug connector and a receptacle connector of a connector assembly according to one preferred embodiment of the present disclosure. Both a plug connector 2 shown in FIG. 1 and a receptacle connector 5 shown in FIG. 2 are of a board mounting type, and upon actual use, are used in a state of being mounted on different boards. The type of board is not particularly limited, and various types of boards such as a rigid board, a flexible board, and a metal base board can be used.

The plug connector 2 (first connector) has a symmetrical shape in a length direction (β) perpendicular to a fitting direction (α) of the plug connector 2 and the receptacle connector 5 and a width direction (γ) perpendicular to both the fitting direction (α) and the length direction (β). The plug connector 2 includes a plurality of plug terminals 20 (first terminals) arrayed along the length direction (β), a conductive plug shell 30 (first shell) forming an outer shell of the plug connector 2, and an insulating plug housing 40 (first housing) integrated with the plug terminals 20 and the plug shell 30 by insert molding.

The length direction (β) is the length direction of the connector assembly, the plug connector 2, and the receptacle connector 5, and the width direction (γ) is the width direction of the connector assembly, the plug connector 2, and the receptacle connector 5.

The plug housing 40 (first housing) has a pair of terminal array portions 47A, 47B (first raised portions). The plurality of plug terminals 20 is held by terminal holding portions 470 of the plug housing 40, and accordingly, is held by the pair of terminal array portions 47A, 47B (first raised portions of the plug housing 40). The plurality of plug terminals 20 is mainly signal terminals, but some of the plurality of plug terminals 20 may be power terminals.

In each terminal array portion 47A, 47B, the surface of the terminal holding portion 470 of the plug housing 40 and the surface of the plug terminal 20 form a substantially semicircular continuous surface. The pair of terminal array portions 47A, 47B is apart from each other in the width direction (γ). A bottomed first recessed portion 45 is provided along the length direction (β) between the terminal array portion 47A and the terminal array portion 47B. A center island 75 (first raised portion of a receptacle housing 70) of the receptacle connector 5 is fitted in the first recessed portion 45.

A pair of second recessed portions 46A, 46B is provided as through-holes along the length direction (β) between each of the terminal array portions 47A, 47B and a peripheral wall 31 (first peripheral wall) of the plug shell 30 extending along the length direction (β). A pair of terminal array portions 76A, 76B (second raised portions) of the receptacle connector 5 is fitted in the pair of second recessed portions 46A, 46B, respectively. The second recessed portions 46A, 46B may be bottomed as in the first recessed portion 45, but are provided as the through-holes as in the present embodiment, so that force upon fitting can be reduced.

The receptacle connector 5 (second connector) has, as in the plug connector 2 (first connector), a symmetrical shape in the length direction (β) and the width direction (γ). The receptacle connector 5 includes a plurality of receptacle terminals 50 (second terminals) arrayed along the length direction (β), a conductive receptacle shell 60 (second shell) forming an outer shell of the receptacle connector 5, and the insulating receptacle housing 70 (second housing) integrated with the receptacle terminals 50 and the receptacle shell 60 by insert molding.

The receptacle housing 70 (second housing) has the pair of terminal array portions 76A, 76B (second raised portions). The plurality of receptacle terminals 50 is held by terminal holding portions 760 of the receptacle housing 70, and accordingly, is held by the pair of terminal array portions 76A, 76B (second raised portions). The plurality of receptacle terminals 50 is mainly signal terminals, but some of the plurality of receptacle terminals 50 may be power terminals.

In each terminal array portion 76A, 76B, the surface of the terminal holding portion 760 of the receptacle housing 70 and the surface of the receptacle terminal 50 form a substantially semicircular continuous surface. The pair of terminal array portions 76A, 76B is apart from each other in the width direction (γ). The center island 75 (first raised portion of the receptacle housing 70) is provided along the length direction (β) between the terminal array portion 76A and the terminal array portion 76B. The center island 75 is positioned closer to the center of the receptacle connector 5 in the length direction (β).

Further, a pair of first recessed portions 77A, 77B is provided along the length direction (β) between the center island 75 and each of the pair of terminal array portions 76A, 76B, which are apart from each other in the width direction (γ). The pair of first recessed portions 77A, 77B is bottomed. The pair of terminal array portions 47A, 47B of the plug connector 2 is fitted in the pair of first recessed portions 77A, 77B, respectively.

Further, a pair of second recessed portions 78A, 78B is provided as through-holes along the length direction (β) between each of the pair of terminal array portions 76A, 76B and a peripheral wall 61 (second peripheral wall) of the receptacle shell 60 extending along the length direction (β). Part of the peripheral wall 31 of the plug connector 2 is fitted in the pair of second recessed portions 78A, 78B. In the present embodiment, the part of the peripheral wall 31 to be fitted in the pair of second recessed portions 78A, 78B is a pair of opposing center portions 320 of the peripheral wall 31. The second recessed portions 78A, 78B may be bottomed as in the first recessed portions 77A, 77B, but are provided as the through-holes as in the present embodiment, so that the force upon fitting can be reduced.

Upon fitting of the plug connector 2 and the receptacle connector 5, the plug shell 30 of the plug connector 2 is fitted in the receptacle shell 60 of the receptacle connector 5. In other words, the receptacle shell 60 of the receptacle connector 5 is fitted onto the plug shell 30 of the plug connector 2. As a result, the plug shell 30 and the receptacle shell 60 are electrically connected to each other, and a shield function of the connector assembly is enhanced.

Part (top portions 350, corner top portions 330, top portion 340, corner top portion resin 431, etc.) of the plug connector 2 positioned at each end portion 49 of the plug connector 2 in the length direction (β) is fitted in a bottomed recessed receiving portion 79 at a corresponding position in the receptacle connector 5. The center island 75 (first raised portion) of the receptacle connector 5 is fitted in the first recessed portion 45 of the plug connector 2. The pair of terminal array portions 47A, 47B (first raised portions) of the plug connector 2 is fitted in the pair of first recessed portions 77A, 77B of the receptacle connector 5, respectively. The pair of terminal array portions 76A, 76B (second raised portions) of the receptacle connector 5 is fitted in the pair of second recessed portions 46A, 46B of the plug connector 2, respectively. The pair of portions (pair of opposing center portions 320) of the peripheral wall 31 of the plug connector 2 is fitted in the pair of second recessed portions 78A, 78B of the receptacle connector 5, respectively.

Figure 3:
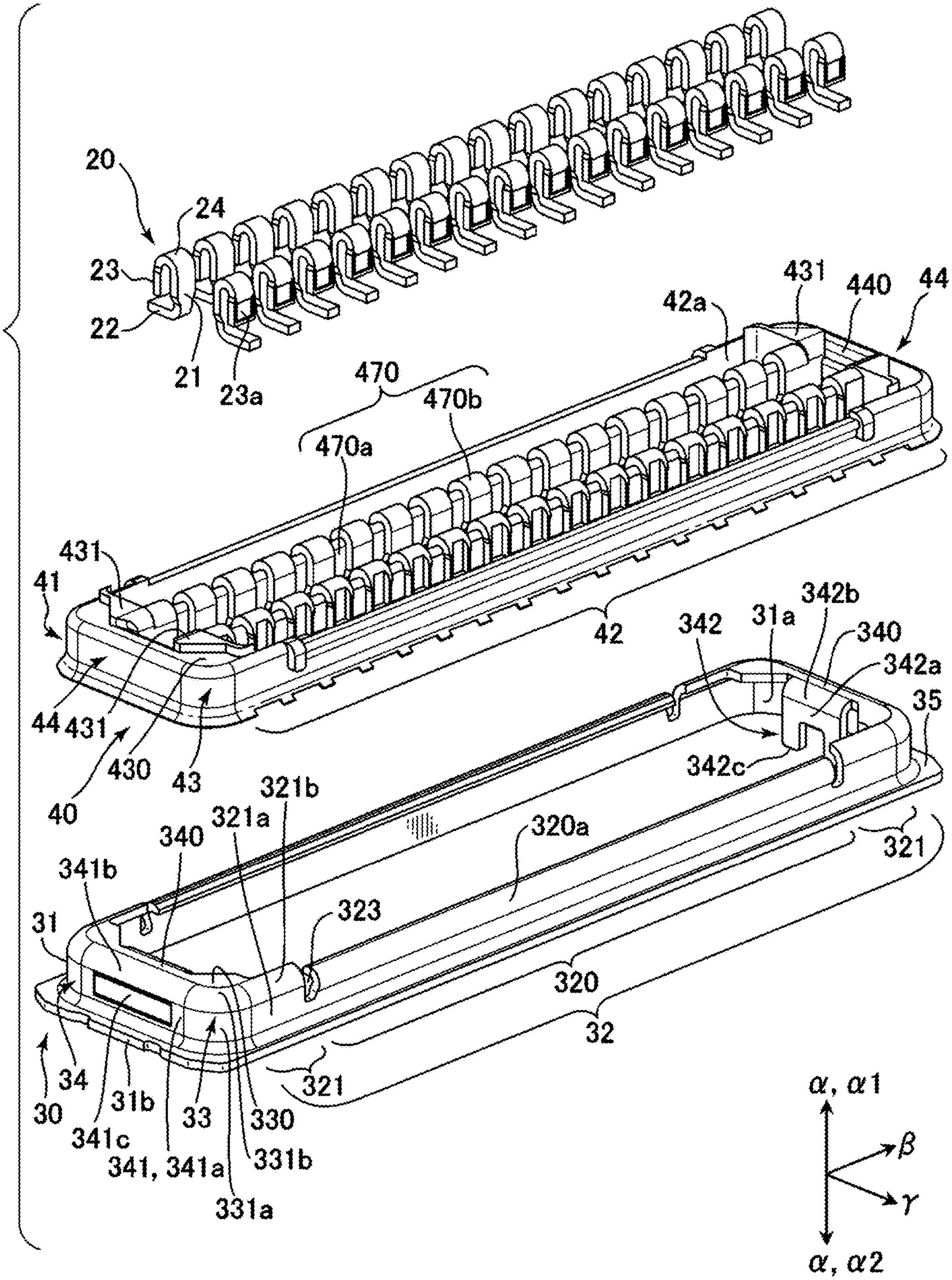
FIG. 3 is an exploded perspective view of the plug connector.
Figure 4:
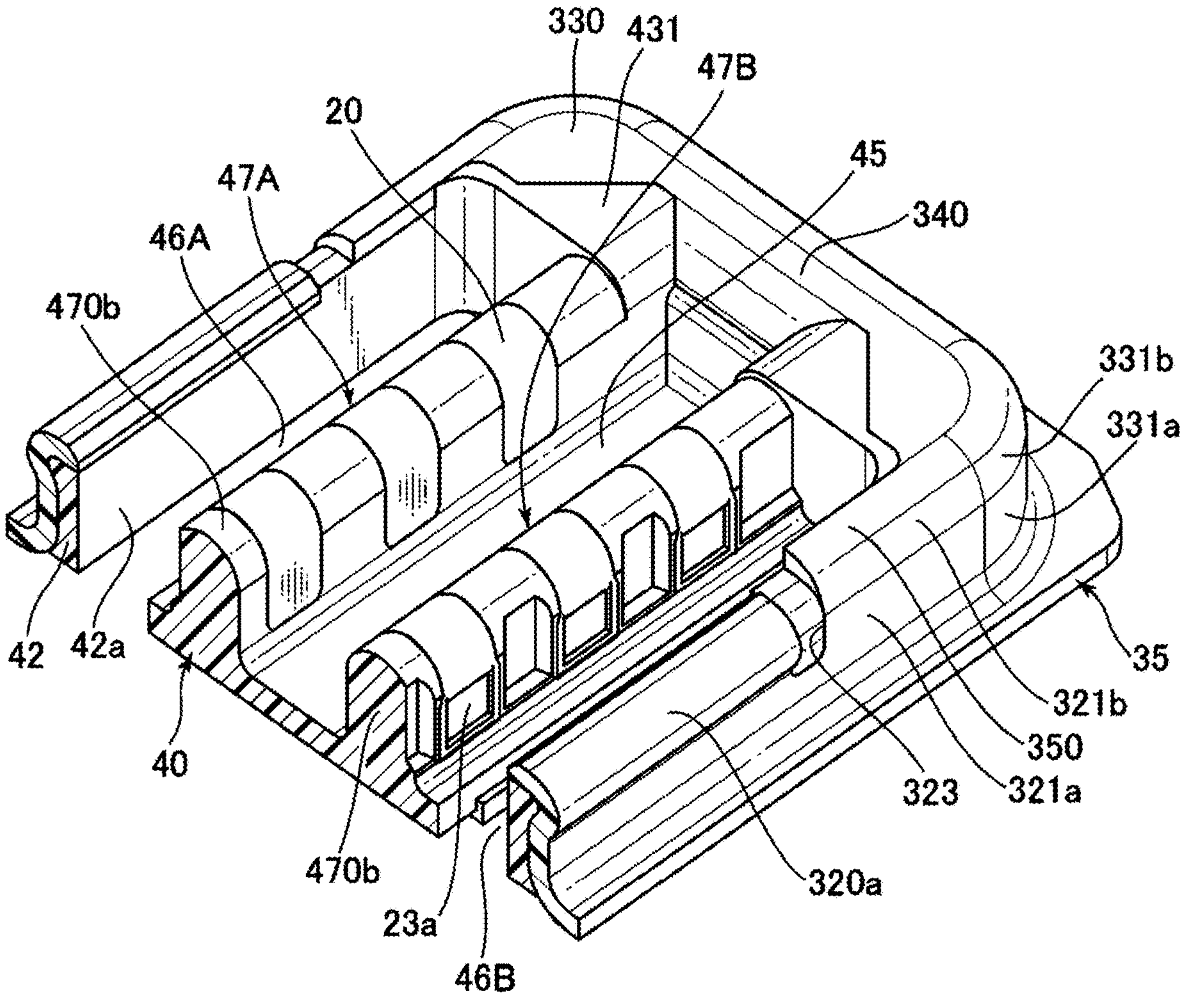
FIG. 4 is a partial sectional perspective view of the vicinity of an A-A line of FIG. 1.
Figure 5:
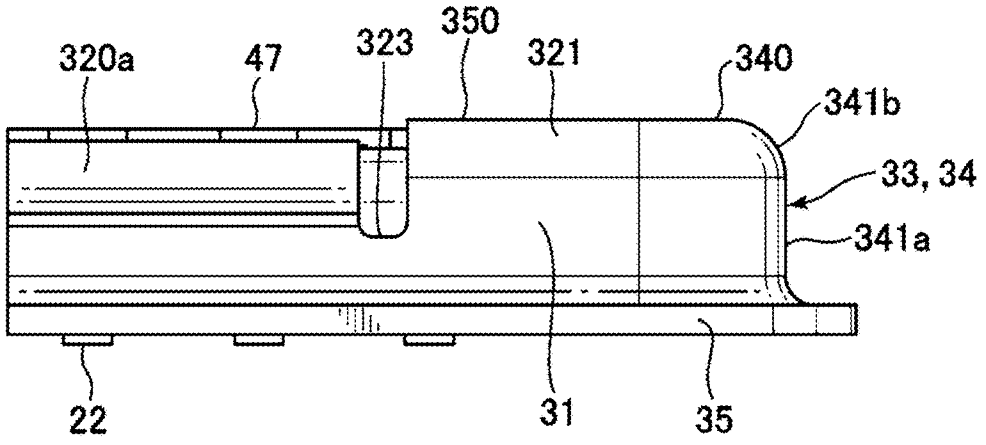
FIG. 5 is a partial side view of FIG. 4.
Figure 6:
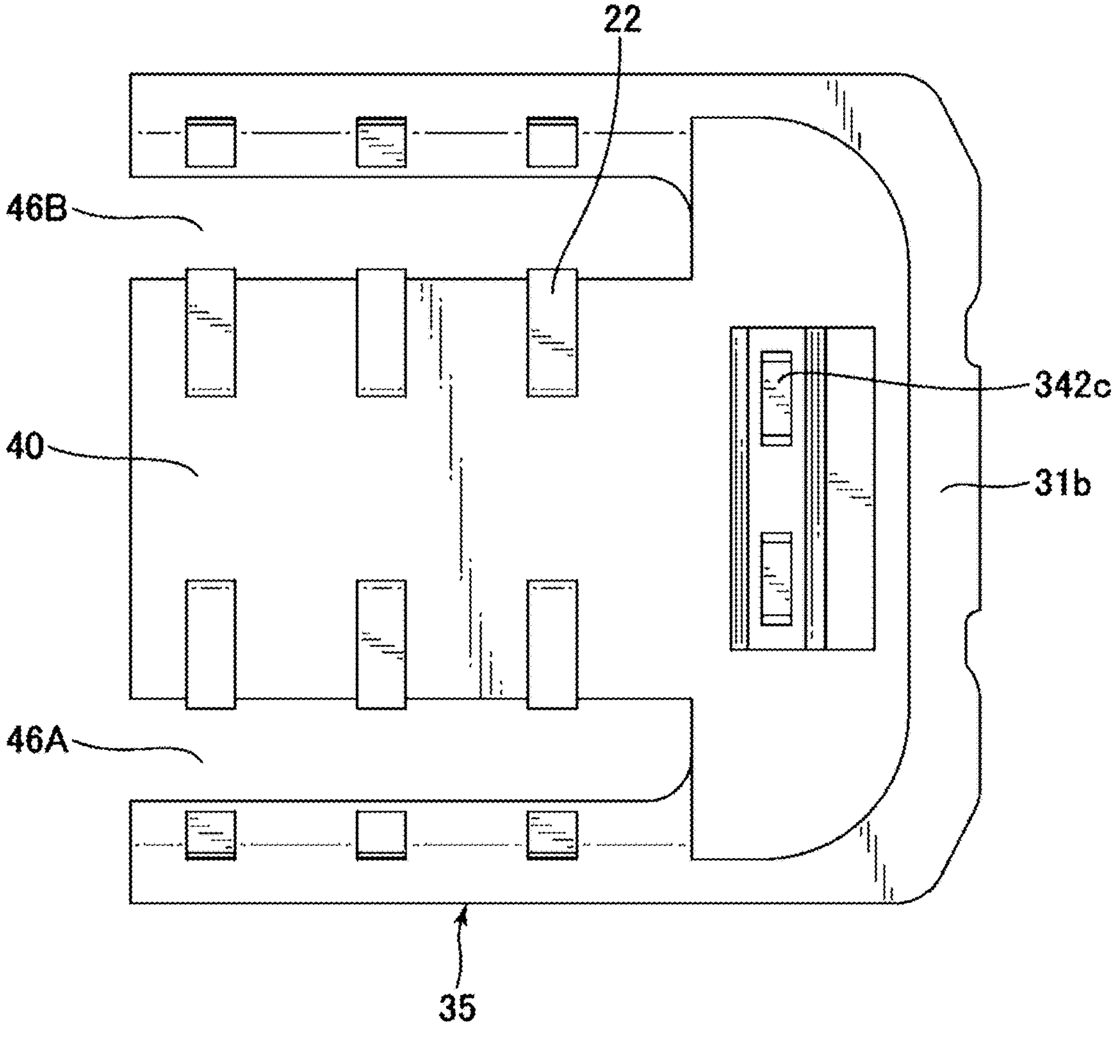
FIG. 6 is a partial bottom view of FIG. 4.
Figure 7:
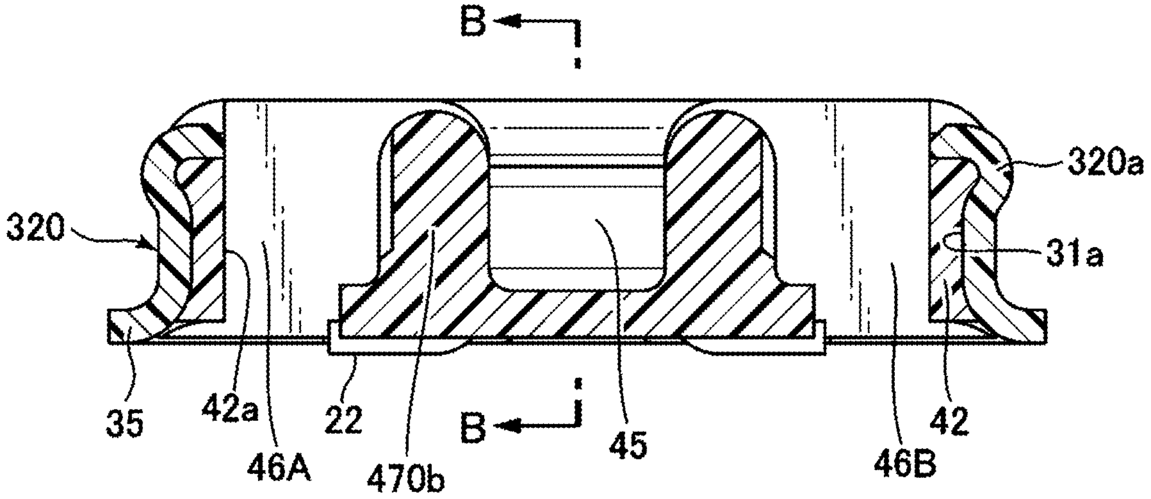
FIG. 7 is a front sectional view in the same section as that of FIG. 4.
Figure 8:
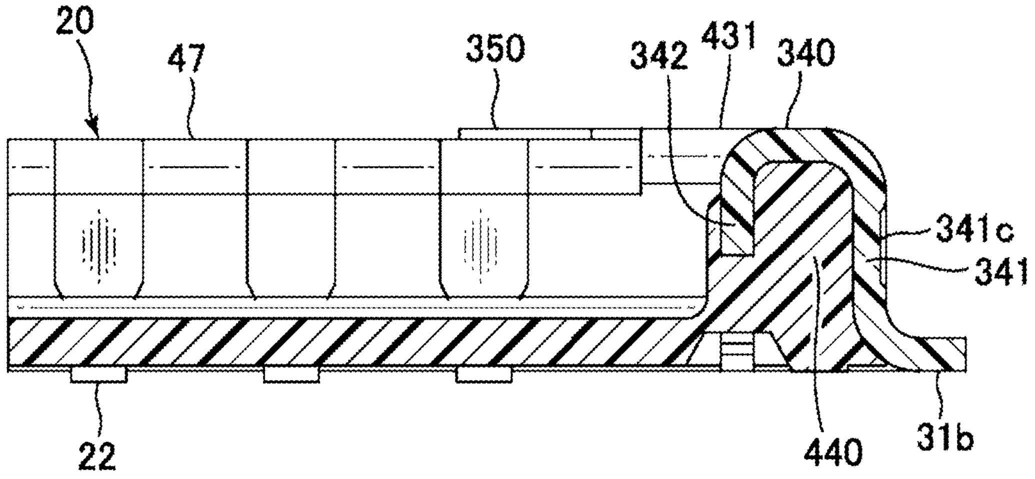
FIG. 8 is a sectional view along a B-B line of FIG. 7.
Figure 9:
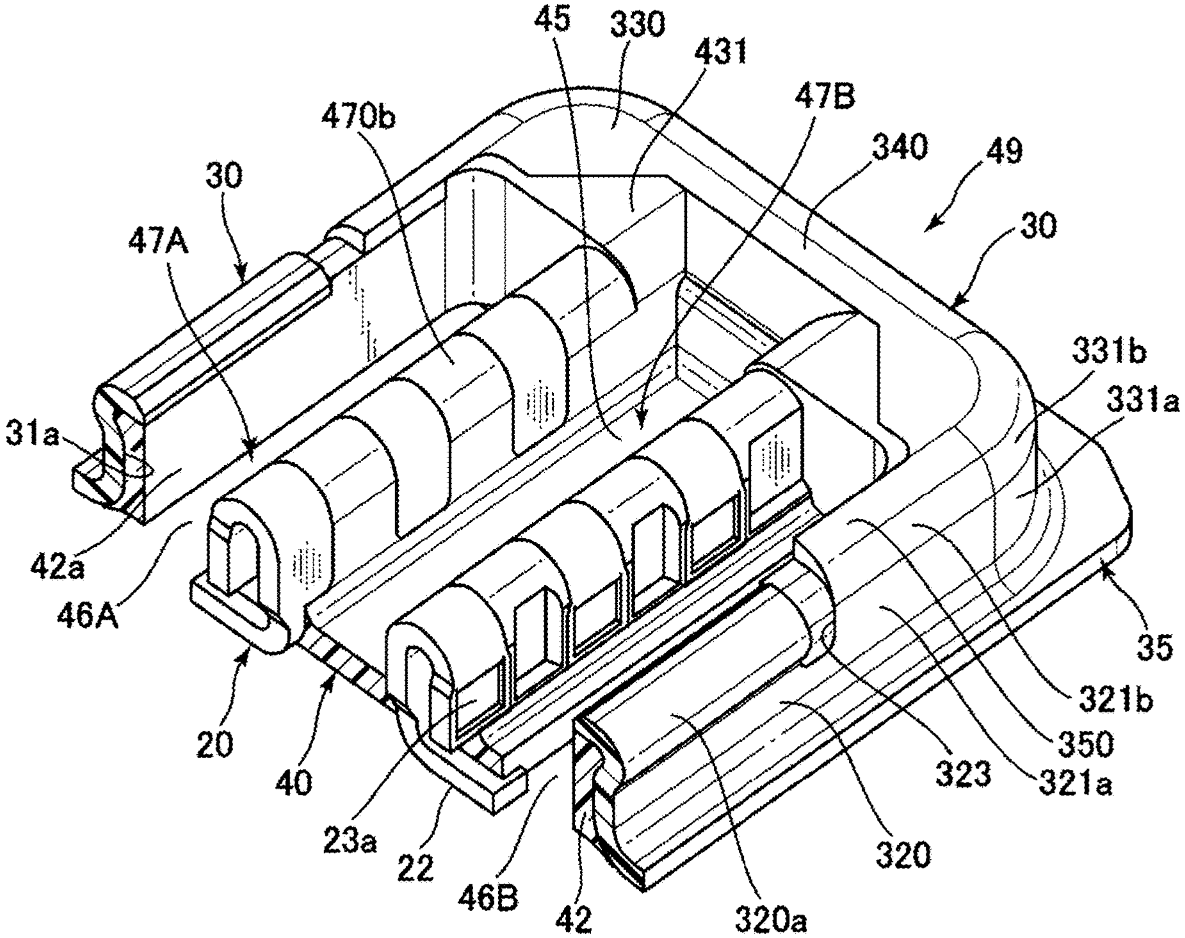
FIG. 9 is a partial sectional perspective view of the vicinity of the A-A line of FIG. 1.
Figure 10:
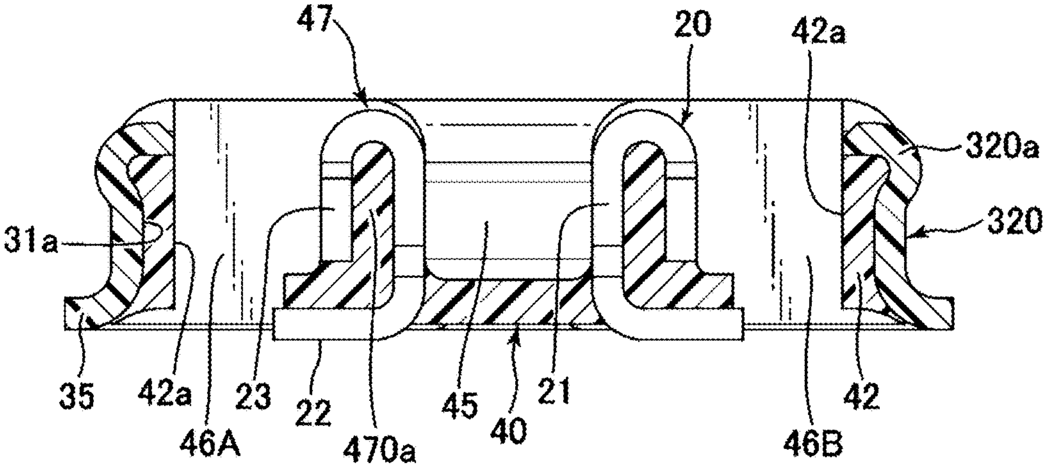
FIG. 10 is a front sectional view in the same section as that of FIG. 9.

The plug connector 2 will be described in more detail with reference to FIGS. 1, 2, and 3 to 12. FIG. 3 is an exploded perspective view of the plug connector 2. FIG. 4 is a partial sectional perspective view of the vicinity of a line A-A of FIG. 1. More specifically, FIG. 4 is a sectional perspective view of inter-terminal resin 470*b* of the housing arranged between the terminals in the length direction (β). FIG. 5 is a partial side view of FIG. 4, and FIG. 6 is a partial bottom view of FIG. 4. FIG. 7 is a front sectional view in the same section as that of FIG. 4, and FIG. 8 is a sectional view along a B-B line of FIG. 7. Further, FIG. 9 shows a partial sectional perspective view of the vicinity of the A-A line of FIG. 1 as in FIG. 4. FIG. 9 shows a state in which the terminal is not cut and terminal inner resin 470*a* filling inside the terminal is omitted. FIG. 10 shows a front sectional view of FIG. 9. Note that as already described, the plug terminals 20, the plug shell 30, and the plug housing 40 are integrated by insert molding, and for this reason, it is impossible to actually disassemble these components. Thus, the exploded perspective view of FIG. 3 is a view for the sake of convenience in description.

As shown in FIG. 3, the plug terminal 20 mainly includes a base portion 21, a contact portion 23, an inverted U-shaped portion 24, and a board mounting portion 22.

The base portion 21 extends along the fitting direction (x), is held by the terminal array portion 47A, 47B (first raised portion) together with the contact portion 23 and the inverted U-shaped portion 24, and forms part of the first recessed portion 45 of the plug connector 2, in which the center island 75 (first raised portion) of the receptacle connector 5 is to be fitted. Upon fitting in the receptacle connector 5, the base portion 21 is contactable with part (elastic contact 54 described later) of the receptacle terminal 50 of the receptacle connector 5.

The contact portion 23 extends in parallel with the base portion 21 along the fitting direction (α), and forms part of the second recessed portion 46A, 46B of the plug connector 2, in which the terminal array portion 76A, 76B (second raised portion) of the receptacle connector 5 is to be fitted. A recessed engagement portion 23*a* is provided in the vicinity of the tip end of the contact portion 23. Upon fitting in the receptacle connector 5, part (engagement contact 57*a* described later) of the receptacle terminal 50 of the receptacle connector 5 is engaged with the recessed engagement portion 23*a*.

The inverted U-shaped portion 24 is an inverted U-shaped curved portion connecting the base portion 21 and the contact portion 23 to each other on the side of fitting (α1) in the receptacle connector 5.

The board mounting portion 22 is a portion to be mounted on the board, and extends from one end of the base portion 21 on the side (α2) opposite to the side of fitting (α1) in the receptacle connector 5 to the outside of the plug connector 2 along the width direction (γ).

When the plug terminal 20 is integrated with the plug housing 40, the side surfaces of the plug terminal 20 are embedded by the inter-terminal resin 470*b* arranged between the terminals, and the inside of the plug terminal 20 is filled with the terminal inner resin 470*a* (see, e.g., FIGS. 3, 4, 7, and 10). Thus, the plug terminal 20 has higher strength as compared to a normal terminal.

The plug shell 30 is formed of a single metal plate by, e.g., punching, bending, and drawing. The plug shell 30 has the frame-shaped peripheral wall 31 surrounding the plug terminals 20 in any "β-γ plane" crossing the fitting direction (α). The peripheral wall 31 has a jointless structure (seamless structure) over the entire circumference, and therefore, the shield function is enhanced as compared to a structure with a joint.

The peripheral wall 31 includes a pair of length-direction portions 32 extending along the length direction (β), a pair of width-direction portions 34 extending in the width direction (γ) at both ends in the length direction (β), and four curved corner portions 33 connecting the length-direction portions 32 and the width-direction portions 34 to each other and curved in the circumferential direction. In at least a partial region along the length direction (β) in which the plug terminals 20 are arrayed, the thickness of the length-direction portion 32 in the width direction (γ) is set smaller than the thickness of a corresponding length-direction portion 62 of the receptacle shell 60 of the receptacle connector 5 in the width direction (γ). Note that the plug housing 40 is provided in close contact with the inner peripheral surface 31*a* of the length-direction portion 32, and therefore, sufficient strength of the length-direction portion 32 is ensured.

An annular board mounting portion 35 extending so as to expand outward of a board mounting surface of the plug connector 2 is provided in the "$\beta$-$\gamma$ plane" at an end portion of the peripheral wall 31 on the side ($\alpha 2$) opposite to the side of fitting ($\alpha 1$) in the receptacle connector 5. That is, the board mounting portion 35 is provided over the entire circumference of the plug shell 30 so as to extend from the end portion of the peripheral wall 31 on the side ($\alpha 2$) opposite to the side of fitting ($\alpha 1$) in the receptacle connector 5 to the outside of the plug connector 2.

The board mounting portion 35 is provided over the entire circumference in the $\beta$-$\gamma$ plane, and is recessed to the side of fitting ($\alpha 1$) in the receptacle connector 5 with respect to the board mounting portion 22 of the plug terminal 20. In other words, the board mounting portion 22 of the plug terminal 20 protrudes to the side ($\alpha 2$) opposite to the side of fitting ($\alpha 1$) in the receptacle connector 5 with respect to the board mounting portion 35 of the plug shell 30 (see, e.g., FIGS. 5, 7, 8, and 10). As a result, the board mounting portion 22 of the plug terminal 20 is arranged closer to the board than the board mounting portion 35 of the peripheral wall 31 is to the board. Thus, for example, even in a case where the board is warped, the plug terminal 20 used for signal transmission can be more reliably mounted on the board in preference to the plug shell 30 used as a shield.

Note that at least any one of the board mounting portions 22 of the plurality of plug terminals 20 may be arranged closer to the board than the board mounting portion 35 of the peripheral wall 31 is to the board.

Part of the length-direction portion 32, i.e., the center portion 320 positioned closer to the center in the length direction ($\beta$), is mainly formed by bending. At an edge portion of the center portion 320 on the side of fitting ($\alpha 1$) in the receptacle connector 5, a locking protruding portion 320*a* rounded inward is provided along the length direction ($\beta$). The locking protruding portion 320*a* is provided in a state of protruding outward to some extent in the width direction ($\gamma$), and when the plug shell 30 of the plug connector 2 is fitted in the receptacle shell 60 of the receptacle connector 5, is locked to a predetermined portion (locking portion 620*a* described later) of the receptacle shell 60.

Another part of the length-direction portion 32, i.e., each end portion 321 positioned closer to the end in the length direction ($\beta$), is mainly formed by drawing, unlike the center portion 320. Both bending and drawing are used for the length-direction portion 32 as described above, and therefore, a cutout 323 is provided between the end portion 321 and the center portion 320 so that different types of machining can be performed.

The end portion 321 includes a body portion 321*a*, a curved portion 321*b*, and the top portion 350. The body portion 321*a* forms a flat surface in the "$\alpha$-$\beta$ plane." The curved portion 321*b* is provided in a state of being slightly curved to the side of fitting ($\alpha 1$) in the receptacle connector 5 with respect to the body portion 321*a*. The top portion 350 is a strip-shaped flat surface along the "$\beta$-$\gamma$ plane," and as shown in FIG. 5, is positioned at the endmost of the plug shell 30 on the side of fitting ($\alpha 1$) in the receptacle connector 5.

The width-direction portion 34 includes an outer wall portion 341 forming the outermost wall portion of the peripheral wall 31 in the length direction ($\beta$), an inner wall portion 342 positioned inside the plug connector 2 with respect to the outer wall portion 341 in the length direction ($\beta$), and the top portion 340 positioned between the outer wall portion 341 and the inner wall portion 342.

The outer wall portion 341 includes a body portion 341*a* and a curved portion 341*b*. The body portion 341*a* forms a substantially flat surface along the "$\alpha$-$\gamma$ plane." Moreover, the body portion 341*a* has, at the center thereof, a rectangular locking recessed portion 341*c* to be locked to a predetermined portion (locking raised portion 650 of an inner wall portion 642) of the receptacle shell 60 of the receptacle connector 5. The curved portion 341*b* is provided in a state of being slightly curved to the side of fitting ($\alpha 1$) in the receptacle connector 5 with respect to the body portion 341*a*.

The inner wall portion 342 includes a body portion 342*a* and a curved portion 342*b*. The body portion 342*a* forms a substantially flat surface in the "$\alpha$-$\beta$ plane." Moreover, an inverted U-shaped cutout is provided at an end portion of the body portion 342*a* on the side opposite to the side of fitting ($\alpha 1$) in the receptacle connector 5. End portions formed by the inverted U-shaped cutout are used as board mounting portions 342*c* together with, e.g., the board mounting portion 35 provided at the outer wall portions 341. The curved portion 342*b* is provided in a state of being slightly curved to the side of fitting ($\alpha 1$) in the receptacle connector 5 with respect to the body portion 342*a*.

Figure 15:
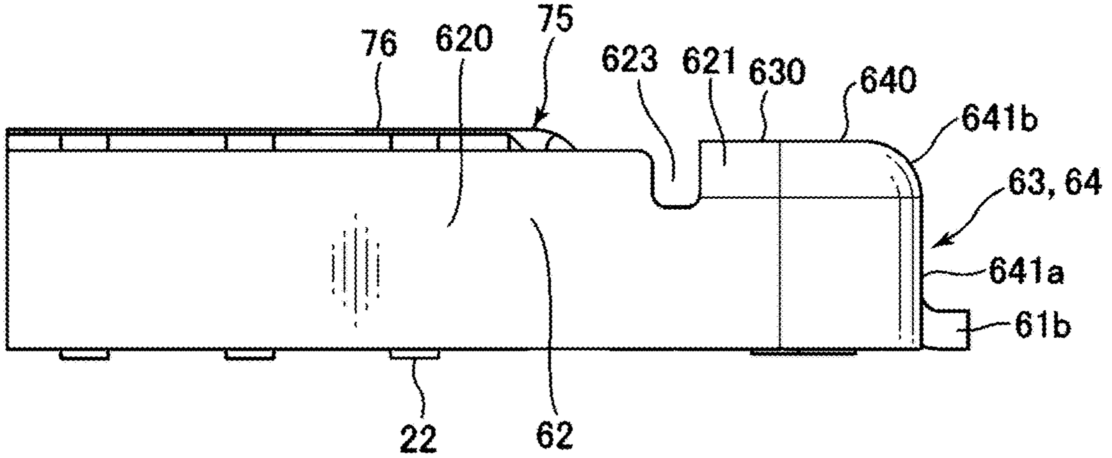
FIG. 15 is a partial side view of FIG. 14.

The top portion 340 is an elongated flat surface along the "$\beta$-$\gamma$ plane," and as in the top portion 350 of the length-direction portion 32, is positioned at the endmost of the plug shell 30 on the side of fitting ($\alpha 1$) in the receptacle connector 5 (see, e.g., FIGS. 4 and 15).

The curved corner portion 33 includes a body portion 331*a* formed linearly in the fitting direction ($\alpha$) and a curved portion 331*b* provided in a state of being slightly curved to the side of fitting ($\alpha 1$) in the receptacle connector 5 with respect to the body portion 331*a*. Further, the curved corner portion 33 includes, at a top portion thereof, a corner top portion 330 which is a substantially triangular flat surface along the "$\beta$-$\gamma$ plane." As in the top portion 350 of the length-direction portion 32 and the top portion 340 of the width-direction portion 34, the corner top portion 330 is positioned at the endmost of the plug shell 30 on the side of fitting ($\alpha 1$) in the receptacle connector 5.

The curved corner portion 33 is in a state of being continuous to the length-direction portion 32 and the width-direction portion 34 in the circumferential direction. More specifically, the body portion 331*a* of the curved corner portion 33 is continuous to the body portion 321*a* of the length-direction portion 32 and the body portion 341*a* of the width-direction portion 34. The curved portion 331*b* of the curved corner portion 33 is continuous to the curved portion 321*b* of the length-direction portion 32 and the curved portion 341*b* of the width-direction portion 34. The corner top portion 330 of the curved corner portion 33 is continuous to the top portion 350 of the length-direction portion 32 and the top portion 340 of the width-direction portion 34.

As shown in FIG. 5, the corner top portion 330 is positioned at the endmost of the plug shell 30 on the side of fitting ($\alpha 1$) in the receptacle connector 5, as in the top portion 350 of the length-direction portion 32 and the top portion 340 of the width-direction portion 34. Further, the corner top portion 330, the top portion 350 of the length-direction portion 32, and the top portion 340 of the width-direction portion 34 are in a state of protruding to the side of fitting ($\alpha 1$) in the receptacle connector 5 with respect to the center portion 320 of the length-direction portion 32 and the terminal array portions 47A, 47B, i.e., are arranged at positions closer to the receptacle connector 5. As a result, upon fitting of the plug connector 2 and the receptacle connector 5, the corner top portion 330, the top portion 350 of the length-direction portion 32, and the top portion 340 of the width-direction portion 34 have a high probability of contacting the receptacle shell 60 of the receptacle connector 5 first, i.e., before the center portion 320 of the length-direction portion 32 and the terminal array portions 47A, 47B. The corner top portion 330, the top portion 350 of the length-direction portion 32, and the top portion 340 of the width-direction portion 34 are portions having the highest strength in the plug connector 2, and therefore, these portions are configured to contact the receptacle shell 60, so that damage of, e.g., the terminal array portions 47A, 47B having lower strength can be effectively prevented.

Figure 11:
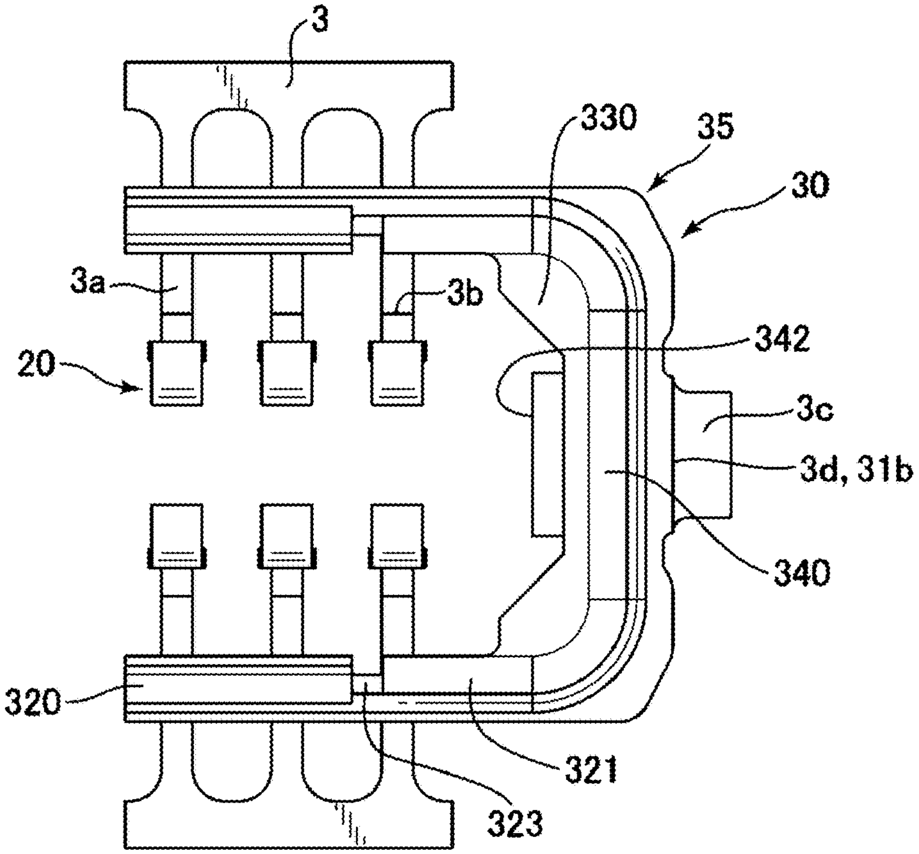
FIG. 11 is a plan view schematically showing a process of manufacturing a plug connector by insert molding.
Figure 12:
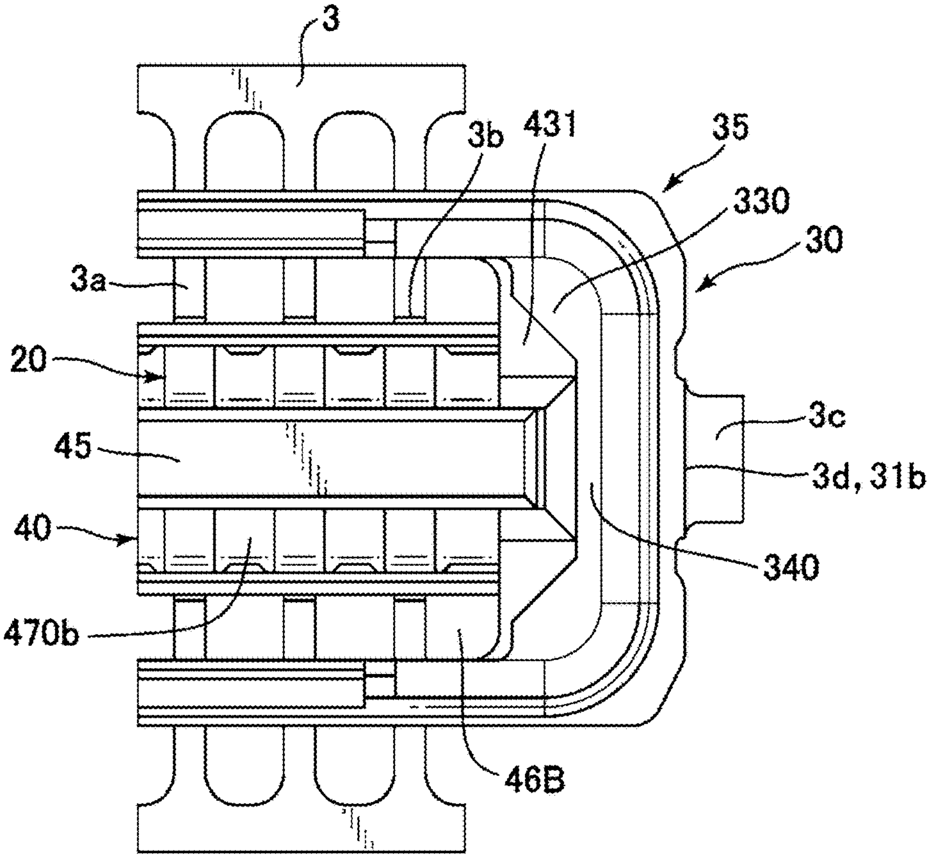
FIG. 12 is a plan view schematically showing the process of manufacturing the plug connector by insert molding.

FIGS. 11 and 12 schematically show a process of manufacturing the plug connector 2 by insert molding.

As shown in FIG. 11, the plug terminals 20 and the plug shell 30 are delivered to a predetermined position, at which a mold (not shown) is provided, in a state of the plug terminals 20 being supported by strip members 3*a* extending from a carrier 3 and a state of the plug shell 30 being supported by a strip member 3*c* extending from the carrier 3.

The delivered plug terminals 20 and plug shell 30 are covered with the mold, and thereafter, resin having flowability is injected into the mold and resin to be the plug housing 40 is solidified. FIG. 12 shows a state immediately after the mold has been removed after the plug housing 40 had been fixed to the plug terminals 20 and the plug shell 30.

Thereafter, the strip members 3*a*, 3*c* of the carrier 3 are cut at predetermined cutting locations 3*b*, 3*d*, and the carrier 3 is cut at a predetermined cutting location. Then, the plug connector 2 is completed. Part 31*b* of the strip member 3*c* at the cutting location 3*d* remains, even after cutting, as part of the plug shell 30 in a state of being exposed to the outside of the plug connector 2. The part 31*b* of the strip member 3*c* can be effectively used as part of the board mounting portion of the plug connector 2.

As clearly seen from the above-described manufacturing process, the plug housing 40 is provided in close contact with the inner peripheral surface 31*a* of the plug shell 30 and the plug terminals 20 after completion of the plug connector 2. Needless to say, the plug housing 40 has a shape corresponding to the inner peripheral surface 31*a* of the plug shell 30 at a portion closely contacting the inner peripheral surface 31*a* of the plug shell 30. Moreover, the plug housing 40 has a shape determined by a relationship with the plug terminal 20 at a position closely contacting the plug terminal 20.

For example, the plug housing 40 includes, at the center of the plug connector 2, the terminal holding portions 470 holding the plug terminals 20. The terminal holding portion 470 includes the terminal inner resin 470*a* filling the inside of the plug terminals 20 and the inter-terminal resin 470*b* arranged between the plug terminals 20.

Further, the plug housing 40 has a peripheral wall 41 corresponding to the peripheral wall 31 of the plug shell 30. As in the peripheral wall 31 of the plug shell 30, the peripheral wall 41 includes a pair of length-direction portions 42 extending along the length direction (β), a pair of width-direction portions 44 extending in the width direction (γ) at both ends in the length direction (β), and four curved corner portions 43 connecting the length-direction portions 42 and the width-direction portions 44 to each other and curved in the circumferential direction.

The inner surface 42*a* of the length-direction portion 42 forms, together with the length-direction portion 32 of the plug shell 30, part of the second recessed portion 46A, 46B of the plug connector 2, in which the terminal array portion 76A, 76B of the receptacle connector 5 is to be fitted.

The width-direction portion 44 includes resin 440. The resin 440 fills a space (sectional space) of the plug shell 30 formed by the outer wall portion 341, the inner wall portion 342, and the top portion 340 forming the width-direction portion 34 of the plug shell 30. By insert molding, substantially all the sectional spaces of the plug shell 30 are filled with the resin 440. The resin 440 can enhance the strength of the width-direction portion 34 of the plug shell 30, on which great force tends to be applied upon fitting of the plug connector 2 and the receptacle connector 5, and can effectively prevent damage of the plug connector 2.

The curved corner portion 43 includes resin 430. The resin 430 fills a space (sectional space) formed by the body portion 331*a*, the curved portion 331*b*, and the corner top portion 330 forming the curved corner portion 33 of the plug shell 30. Further, the curved corner portion 43 includes the corner top portion resin 431. The corner top portion resin 431 is coupled to the terminal array portion 47A, 47B, and is surrounded by the corner top portion 330, the top portion 350, and the top portion 340 of the plug shell 30. As in the corner top portion 330, the corner top portion resin 431 is formed in a substantially triangular shape, and forms a flat surface along the "β-γ plane." As in, e.g., the corner top portion 330 of the plug shell 30, the corner top portion resin 431 is positioned at the endmost of the plug housing 40 on the side of fitting (α1) in the receptacle connector 5. Thus, as in, e.g., the corner top portion 330 of the plug shell 30, the corner top portion resin 431 alone can effectively prevent damage of, e.g., the terminal array portion 47A, 47B, and can reinforce, e.g., the corner top portion 330 of the plug shell 30.

In the plug connector 2, at least any one of part of the plug shell 30 or part of the plug housing 40 positioned at the end portion of the plug connector 2 in the length direction (β) may protrude to the side of fitting (α1) in the receptacle connector 5 with respect to the terminal array portion 47A, 47B (first raised portion).

Alternatively, in the plug connector 2, at least any one of part of the plug shell 30 or part of the plug housing 40 positioned at the end portion of the plug connector 2 in the length direction (β) may protrude to the side of fitting (α1) in the receptacle connector 5 with respect to the center portion 320 of the plug shell 30.

Figure 13:
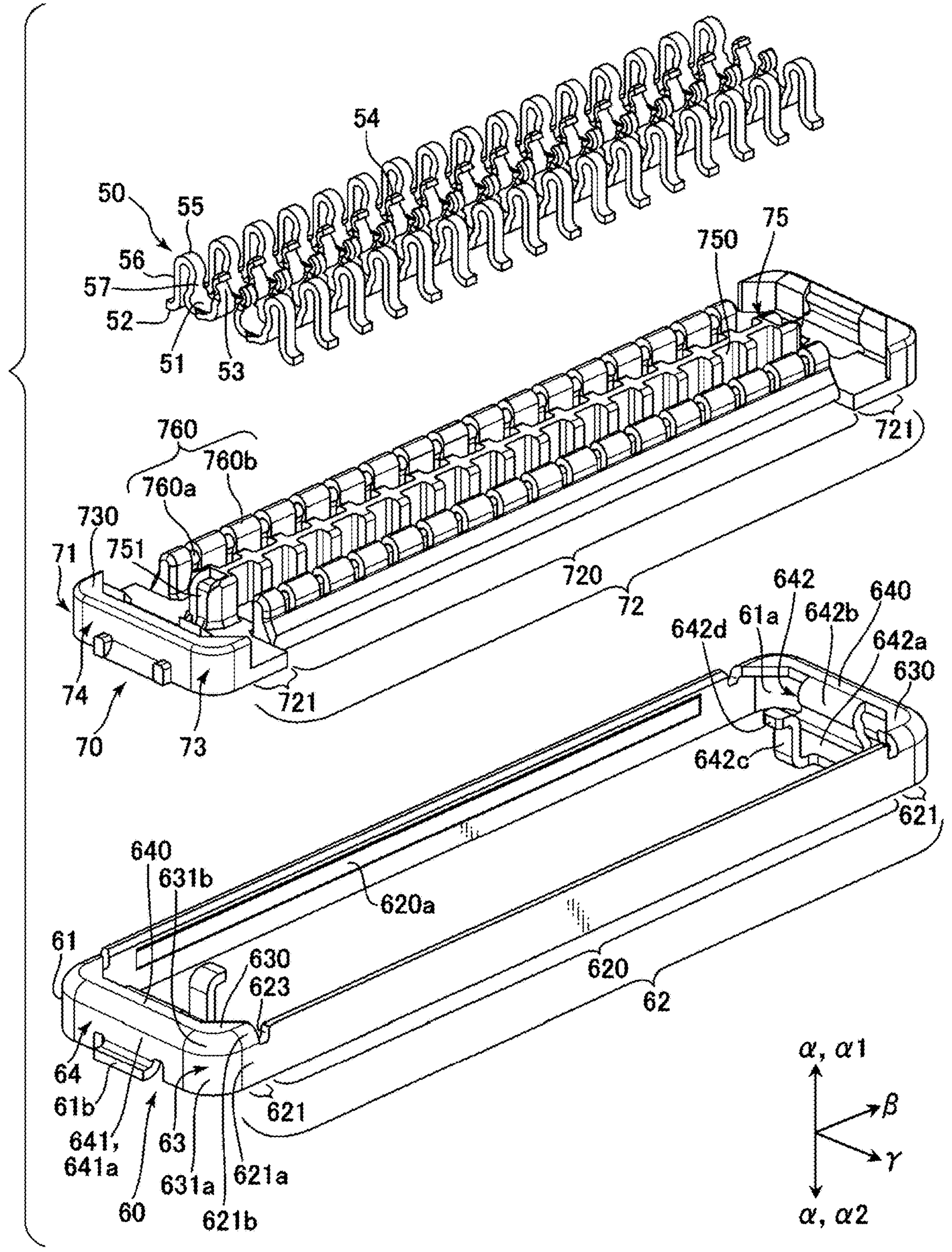
FIG. 13 is an exploded perspective view of the receptacle connector.
Figure 14:
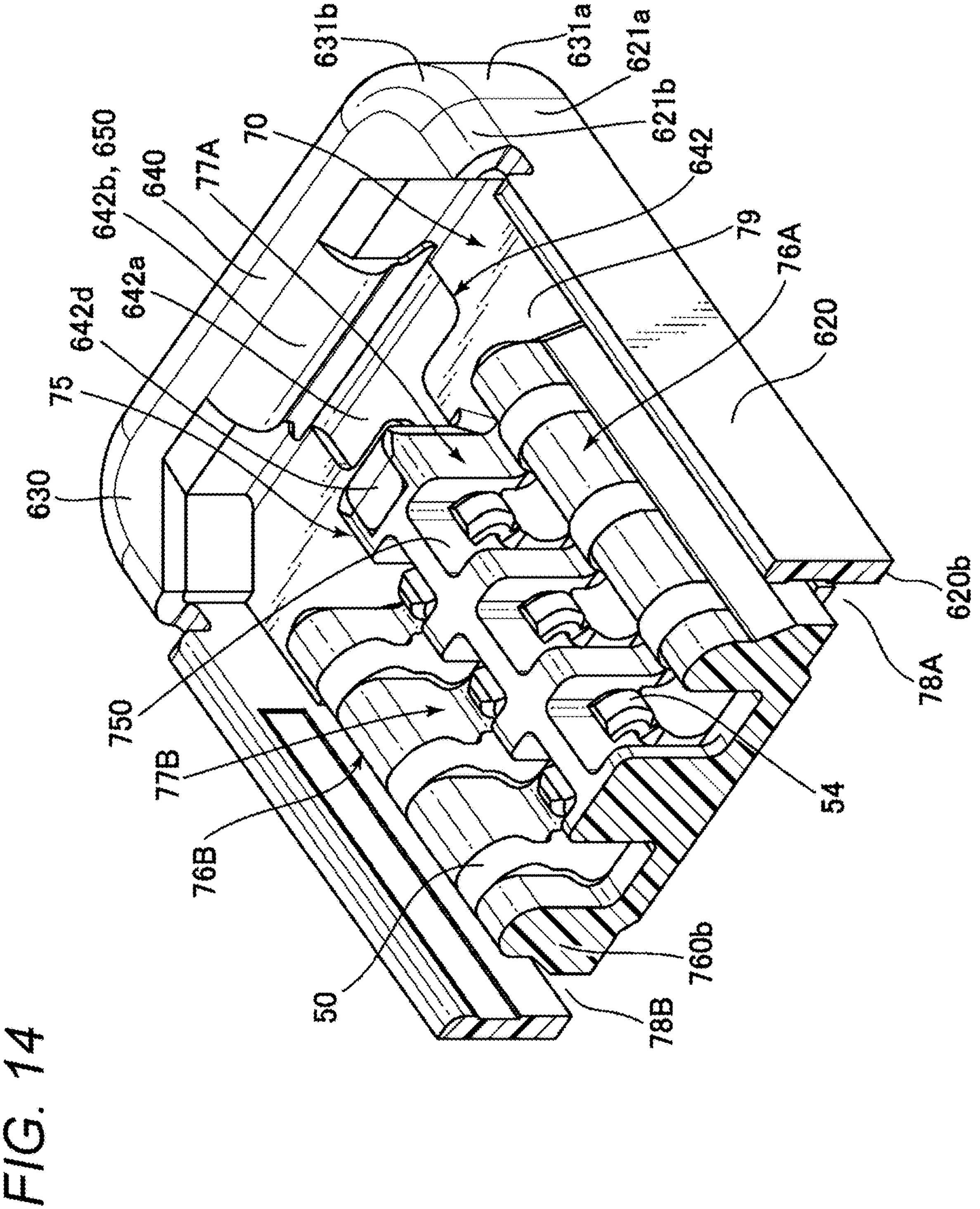
FIG. 14 is a partial sectional perspective view of the vicinity of a C-C line of FIG. 2.
Figure 16:
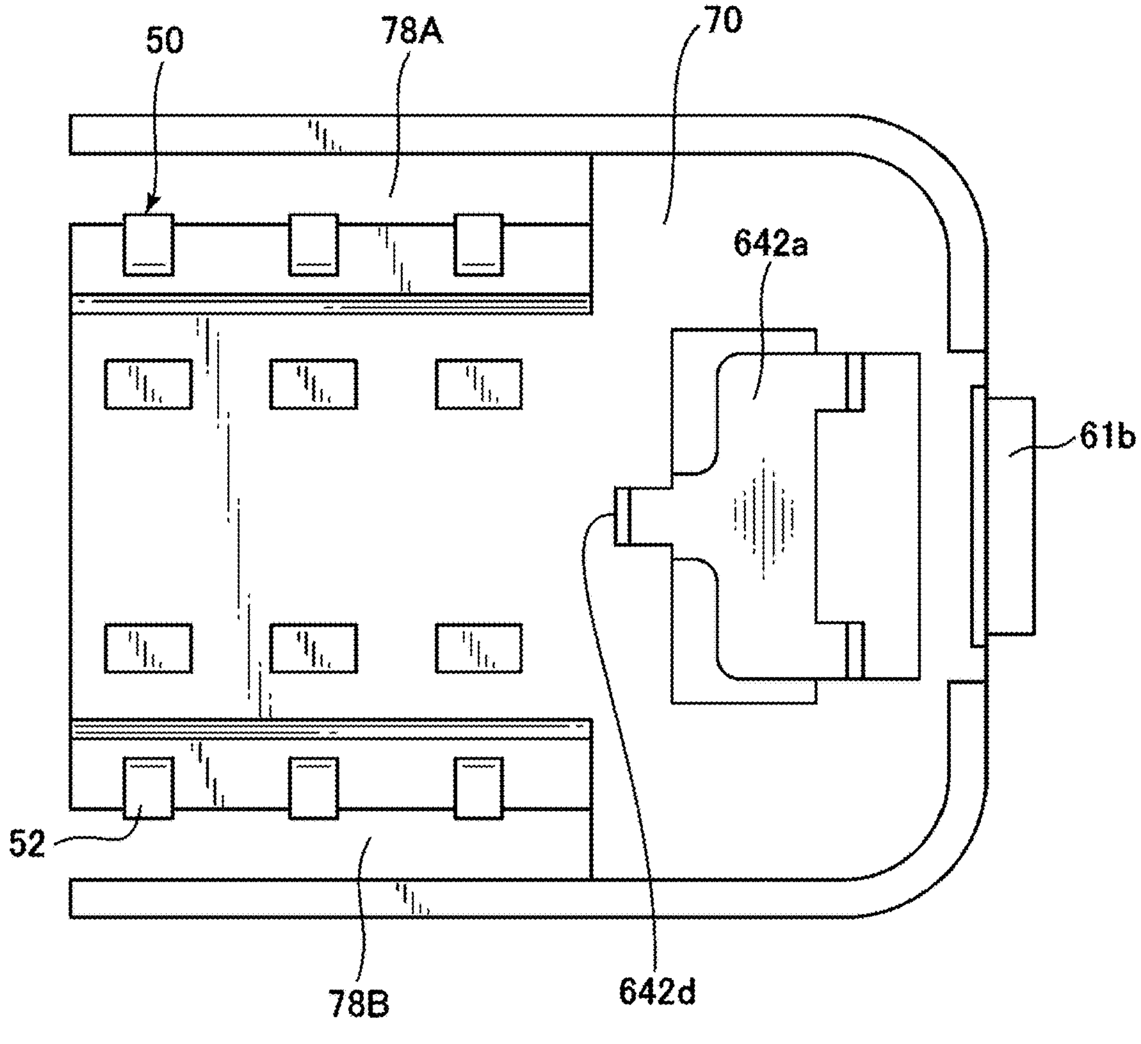
FIG. 16 is a partial bottom view of FIG. 14.
Figure 17:
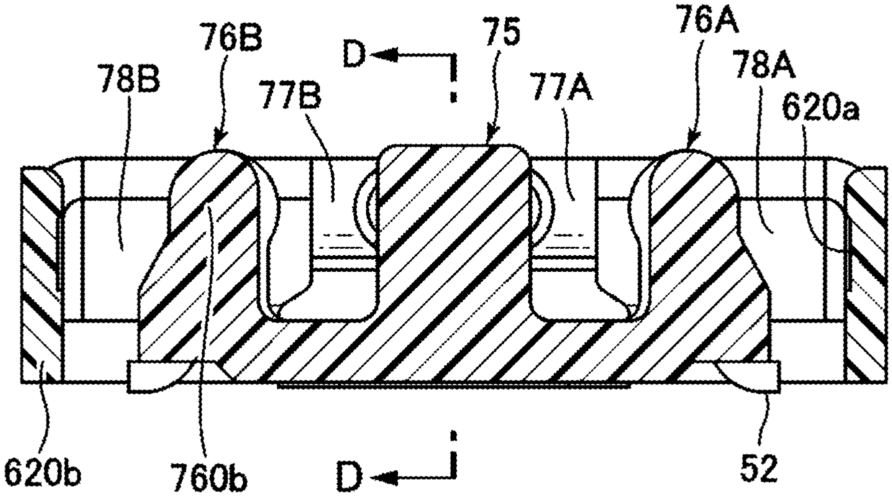
FIG. 17 is a sectional view of FIG. 14.
Figure 18:
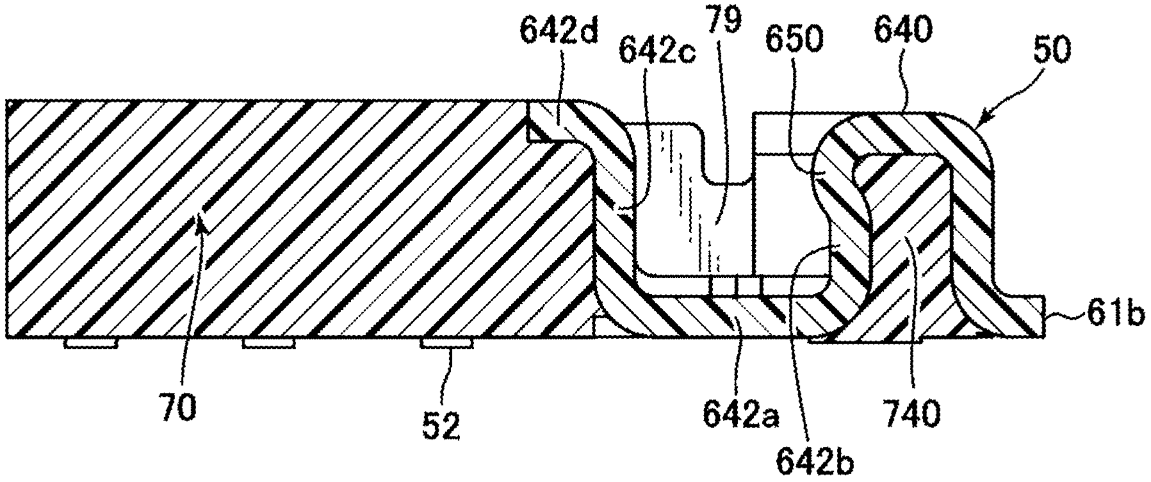
FIG. 18 is a sectional view along a D-D line of FIG. 17.
Figure 19:
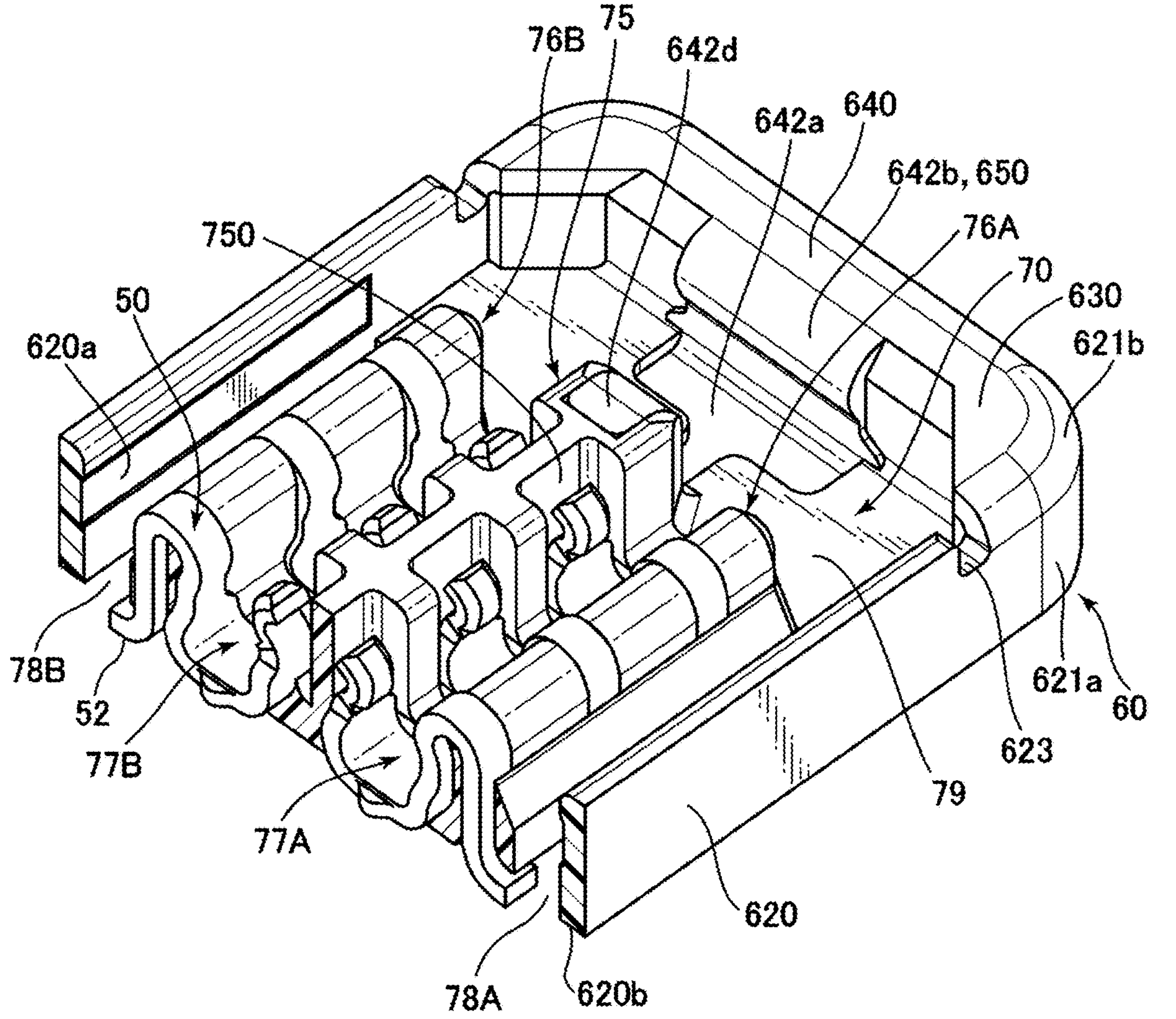
FIG. 19 is a partial sectional perspective view of the vicinity of the C-C line of FIG. 2.
Figure 20:
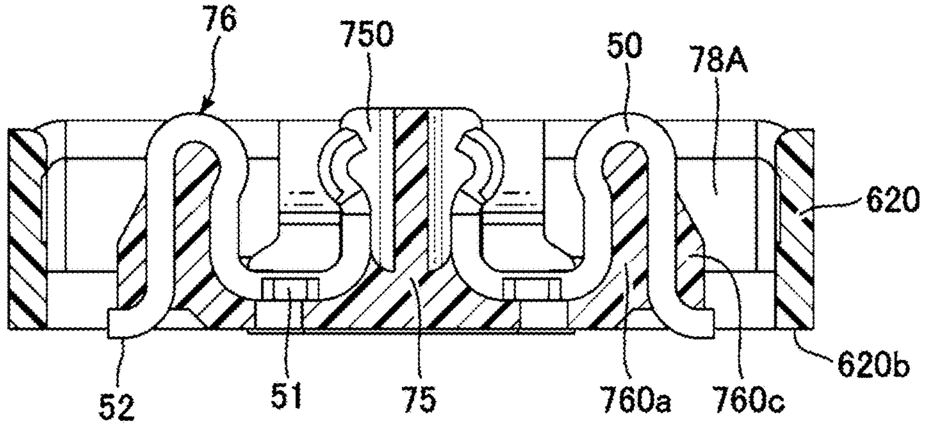
FIG. 20 is a front sectional view in the same section as that of FIG. 19.

The receptacle connector 5 will be described in more detail with reference to FIGS. 1, 2, and 13 to 22. FIGS. 13 to 22 each correspond to FIGS. 3 to 12 already described. FIG. 13 is an exploded perspective view of the receptacle connector 5. FIG. 14 is a partial sectional perspective view of the vicinity of a line C-C of FIG. 2. FIG. 14 shows the section of inter-terminal resin 760*b* of the housing. FIG. 15 is a partial side view of FIG. 14, and FIG. 16 is a partial bottom view of FIG. 14. FIG. 17 is a sectional view of FIG. 14, and FIG. 18 is a sectional view along a D-D line of FIG. 17. Further, FIG. 19 shows a partial sectional perspective view of the vicinity of the C-C line of FIG. 2 as in FIG. 14. More specifically, FIG. 19 is a partial sectional perspective view along a terminal side surface, which does not show terminal inner resin 760*a* filling the inside of the terminal. FIG. 20 shows a front sectional view of FIG. 19. Note that as already described, the receptacle terminals 50, the receptacle shell 60, and the receptacle housing 70 are integrated by insert molding, and therefore, it is impossible to actually disassemble these components. Thus, the exploded perspective view of FIG. 13 is a view for the sake of convenience in description.

As shown in FIG. 13, the receptacle terminal 50 mainly includes a base portion 51, an elastic contact portion 53, a fixed contact portion 57, a fixed leg portion 56, an inverted U-shaped portion 55, and a board mounting portion 52.

The base portion 51 is a portion forming a bottom portion of the receptacle terminal 50, and is formed wider in the width direction (γ) than other portions. Moreover, the base portion 51 forms, together with the elastic contact portion 53 and the fixed contact portion 57, part of the first recessed portion 77A, 77B of the receptacle connector 5, in which the terminal array portion 47A, 47B of the plug connector 2 is to be fitted.

The elastic contact portion 53 is a portion elastically displaceably standing from one end of the base portion 51 to the center island 75 (first raised portion) and the side of fitting (α1) in the plug connector 2, and in the vicinity of the tip end thereof, has the elastic contact 54. Upon fitting in the plug connector 2, the elastic contact 54 elastically contacts the base portion 21 of the plug terminal 20 of the plug connector 2. In order to house the elastic contact portion 53, a recessed portion 750 is provided corresponding to each elastic contact portion 53 in the center island 75.

The fixed contact portion 57 is a portion standing from the other end of the base portion 51 to the side of fitting (α1) in the plug connector 2, and together with the fixed leg portion 56 and the inverted U-shaped portion 55, is held by the terminal array portion 76A, 76B (second raised portion). The fixed contact portion 57 has the engagement contact 57*a* in the vicinity of a portion coupled to the inverted U-shaped portion 55, and upon fitting in the plug connector 2, contacts the contact portion 23 of the plug terminal 20 of the plug connector 2 at the engagement contact 57*a*. In this state, the engagement contact 57*a* is engaged with the engagement portion 23*a* provided in the vicinity of the tip end of the contact portion 23.

The fixed leg portion 56 extends along the fitting direction (α), and is provided in a state of being fixed to the receptacle housing 70. The fixed leg portion 56 forms part of the second recessed portion 78A, 78B. In the second recessed portions 78A, 78B, the pair of portions (pair of opposing center portions 320) of the peripheral wall 31 of the plug connector 2 is fitted. Of the surface of the fixed leg portion 56 forming the second recessed portion 78A, 78B, the surface facing the plug shell 30 of the plug connector 2 fitted in the second recessed portion 78A, 78B is covered with resin 760*c* in order to reliably prevent contact with the plug shell 30.

The inverted U-shaped portion 55 is an inverted U-shaped curved portion connecting the fixed contact portion 57 and the fixed leg portion 56 to each other on the side of fitting (α1) in the plug connector 2.

The board mounting portion 52 is provided at an end portion of the fixed leg portion 56 on the side (α2) opposite to the side of fitting (α1) in the plug connector 2. The receptacle terminal 50 is fixed to the board through the board mounting portion 52.

The receptacle shell 60 is formed of a single metal plate by, e.g., punching, bending, and drawing. The receptacle shell 60 has the frame-shaped peripheral wall 61 surrounding the receptacle terminals 50 in any "β-γ plane" crossing the fitting direction (α). The peripheral wall 61 has a jointless structure over the entire circumference, and therefore, the shield function is enhanced as compared to a structure with a joint.

Note that in the connector assembly of the present disclosure, at least any one of the peripheral wall 31 or the peripheral wall 61 may have the jointless structure over the entire circumference.

The peripheral wall 61 includes the pair of length-direction portions 62 extending along the length direction (β), a pair of width-direction portions 64 extending in the width direction (γ) at both ends in the length direction (β), and four curved corner portions 63 connecting the length-direction portions 62 and the width-direction portions 64 to each other and curved in the circumferential direction. In at least a partial region along the length direction (β) in which the receptacle terminals 50 are arrayed, the thickness of the length-direction portion 62 in the width direction (γ) is set greater than the thickness of the corresponding length-direction portion 32 of the plug shell 30 of the plug connector 2 in the width direction (γ). Thus, strength when the receptacle shell 60 is fitted onto the plug shell 30 is ensured.

At an end portion of the peripheral wall 61 on the side (α2) opposite to the side of fitting (α1) in the plug connector 2, i.e., an end surface of the receptacle shell 60 extending linearly along a plate surface along the fitting direction (α), an annular board mounting portion 620*b* is provided using a fracture surface of the receptacle shell 60. Since the fracture surface is used, the board mounting portion 620*b* is not expanded in the "β-γ plane" as in the board mounting portion 35 of the plug shell 30, and as a result, the connector assembly can be reduced in size particularly in the width direction (γ). Note that the board mounting portion 620*b* is not necessarily formed of the fracture surface. The board mounting portion 620*b* may be slightly expanded in the "β-γ plane" as in the board mounting portion 35 of the plug shell 30 to such an extent that the board mounting portion 620*b* is substantially within the area of expansion of the board mounting portion 35 of the plug shell 30 in the width direction (γ).

The board mounting portion 620*b* is in a state of being recessed to the side of fitting (α1) in the plug connector 2 with respect to the board mounting portion 52 of the receptacle terminal 50. In other words, the board mounting portion 52 of the receptacle terminal 50 is in a state of protruding to the side (α2) opposite to the side of fitting (α1) in the plug connector 2 with respect to the board mounting portion 620*b* of the receptacle shell 60 (see, e.g., FIGS. 15, 17, 18, and 20). As a result, the board mounting portion 52 of the receptacle terminal 50 is arranged closer to the board than the board mounting portion 620*b* of the peripheral wall 61 is to the board. Thus, for example, even in a case where the board is warped, the receptacle terminal 50 used for signal transmission can be more reliably mounted on the board in preference to the receptacle shell 60 used as a shield.

Note that at least any one of the board mounting portions 52 of the plurality of receptacle terminals 50 may be arranged closer to the board than the board mounting portion 620*b* of the peripheral wall 61 is to the board.

Part of the length-direction portion 62, i.e., a center portion 620 positioned closer to the center in the length direction (β), is mainly formed by bending. In the inner peripheral surface 61*a* of the receptacle shell 60 at the center portion 620, the recessed locking portion 620*a* is provided along the length direction (β). When the plug shell 30 of the plug connector 2 is fitted in the receptacle shell 60 of the receptacle connector 5, the locking protruding portion 320*a* provided at the plug shell 30 of the plug connector 2 is locked to the locking portion 620*a*. In this manner, the plug connector 2 is locked to the receptacle connector 5 in the length direction (β).

Another part of the length-direction portion 62, i.e., each end portion 621 positioned closer to the end in the length direction (β), is mainly formed by drawing, unlike the center portion 620. Both bending and drawing are used for the length-direction portion 62 as described above, and therefore, a cutout 623 is provided between the end portion 621 and the center portion 620 so that different types of machining can be performed.

The end portion 621 includes a body portion 621*a*, a curved portion 621*b*, and a corner top portion 630 formed together with the curved corner portion 63. The body portion 621*a* forms a flat surface in the "a-β plane." The curved portion 621*b* is provided in a state of being slightly curved to the side of fitting (α1) in the plug connector 2 with respect to the body portion 621*a*.

The width-direction portion 64 includes an outer wall portion 641 forming the outermost wall portion of the peripheral wall 61 in the length direction (β), the inner wall portion 642 positioned inside the receptacle connector 5 with respect to the outer wall portion 641 in the length direction (β), and a top portion 640 positioned between the outer wall portion 641 and the inner wall portion 642.

The outer wall portion 641 includes a body portion 641*a* and a curved portion 641*b*. The body portion 641*a* forms a substantially flat surface along the "α-γ plane," and the curved portion 641*b* is provided in a state of being slightly curved to the side of fitting (α1) in the plug connector 2 with respect to the body portion 641*a*.

The inner wall portion 642 is a member forming part of the receiving portion 79. The receiving portion 79 receives, together with the receptacle housing 70, the end portion 49 of the plug connector 2 in the length direction (β). The inner wall portion 642 includes a base portion 642*a*, a locking portion 642*b*, a standing portion 642*c*, and a cover portion 642*d*.

The base portion 642*a* is a portion forming a bottom portion of the inner wall portion 642 and forming part of the bottommost of the receptacle connector 5, and is designed wider in the width direction (γ). The bottom surface (see FIG. 16) of the base portion 642*a* can also be used as a board mounting portion of the receptacle connector 5.

The locking portion 642*b* is a portion standing in a state of being curved to the side of fitting (α1) in the plug connector 2 at one end of the base portion 642*a* in the length direction (β), specifically at one end of the base portion 642*a* positioned on the outer end side in the receptacle connector 5. The locking portion 642*b* is provided with the locking raised portion 650 which protrudes toward the receiving portion 79. The locking raised portion 650 has the substantially same width as that of the base portion 642*a* in the width direction (γ), and upon fitting of the plug connector 2 and the receptacle connector 5, is fitted in the locking recessed portion 341*c* provided in the plug shell 30 of the plug connector 2 and locks the plug connector 2 to the receptacle connector 5.

The standing portion 642*c* is a portion linearly standing to the side of fitting (α1) in the plug connector 2 so as to cover part of the center island 75 at the other end of the base portion 642*a* in the length direction (β), specifically at one end of the base portion 642*a* positioned on the inner end side in the receptacle connector 5. The standing portion 642*c* covers part of the end-side wall surface of the center island 75 to enhance the strength thereof.

The cover portion 642*d* is a portion formed by bending of the tip end of the standing portion 642*c* and extending in the "β-γ plane," and covers part of the top surface of the center island 75 to enhance the strength of the center island 75.

The top portion 640 has an elongated flat surface along the "β-γ plane," and as in the length-direction portion 62 and the corner top portion 630 formed using the curved corner portion 63, is positioned at the endmost of the receptacle shell 60 on the side of fitting (α1) in the plug connector 2 (see, e.g., FIGS. 14 and 15).

The curved corner portion 63 includes a body portion 631*a* linearly formed in the fitting direction (α) and a curved portion 631*b* provided in a state of being slightly curved to the side of fitting (α1) in the plug connector 2 with respect to the body portion 631*a*. Further, the curved corner portion 63 includes, at a top portion thereof, the corner top portion 630 formed together with the length-direction portion 62. As in the corner top portion 330 formed at the curved corner portion 33 of the plug connector 2, the corner top portion 630 has a substantially triangular flat surface along the "β-γ plane."

The curved corner portion 63 is continuous to the length-direction portion 62 and the width-direction portion 64 in the circumferential direction. More specifically, the body portion 631*a* of the curved corner portion 63 is continuous to the body portion 621*a* of the length-direction portion 62 and the body portion 641*a* of the width-direction portion 64. The curved portion 631*b* of the curved corner portion 63 is continuous to the curved portion 621*b* of the length-direction portion 62 and the curved portion 641*b* of the width-direction portion 64. The corner top portion 630 of the curved corner portion 63 is continuous to the top portion 640 of the width-direction portion 64.

As shown in FIG. 15, the center island 75 and the terminal array portions 76A, 76B of the receptacle connector 5 are positioned at the endmost of the receptacle shell 60 on the side of fitting (α1) in the plug connector 2. Further, the center island 75 and the terminal array portions 76A, 76B are in a state of protruding to the side of fitting (α1) in the plug connector 2 with respect to the receptacle shell 60, i.e., are arranged closer to the plug connector 2. Upon fitting of the plug connector 2 and the receptacle connector 5, the center island 75 and the terminal array portions 76A, 76B function as guide portions for the first recessed portion 45 and the second recessed portions 46A, 46B of the plug connector 2, and as a result, a fitting process can be facilitated. Note that in the present embodiment, the center island 75 of the receptacle connector 5 is positioned slightly closer to the side of fitting (α1) in the plug connector 2 with respect to the terminal array portions 76A, 76B, but in terms of guiding, such a positional difference is not a great difference.

In the receptacle connector 5, at least any one of the center island 75 (first raised portion) or the terminal array portions 76A, 76B (second raised portions) may protrude to the side of fitting (α1) in the plug connector 2 with respect to the receptacle shell 60.

The corner top portion 630 and the top portion 640 of the width-direction portion 64 are in a state of protruding to the side of fitting (α1) in the plug connector 2 with respect to the center portion 620 of the length-direction portion 62 on the side of fitting (α1) in the plug connector 2, i.e., are arranged closer to the plug connector 2. As a result, upon fitting of the plug connector 2 and the receptacle connector 5, the corner top portion 630 and the top portion 640 of the width-direction portion 64 have a higher probability of contacting the plug shell 30 of the plug connector 2 before the center portion 320 of the length-direction portion 32. The corner top portion 630 and the top portion 640 are portions having the highest strength in the receptacle connector 5, and therefore, these portions are configured to contact the plug shell 30 so that damage of other portions of the receptacle connector 5 having lower strength can be effectively prevented.

Figure 21:
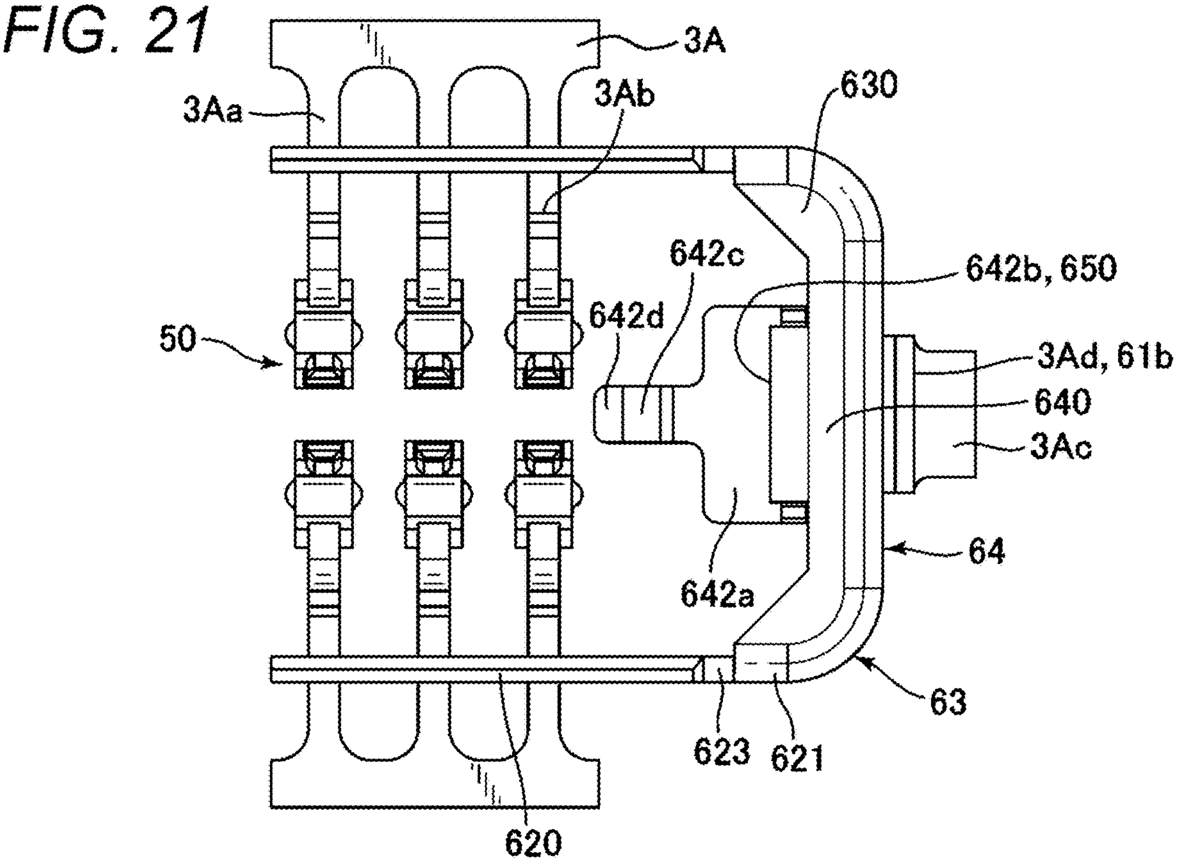
FIG. 21 is a plan view schematically showing a process of manufacturing a receptacle connector by insert molding.
Figure 22:
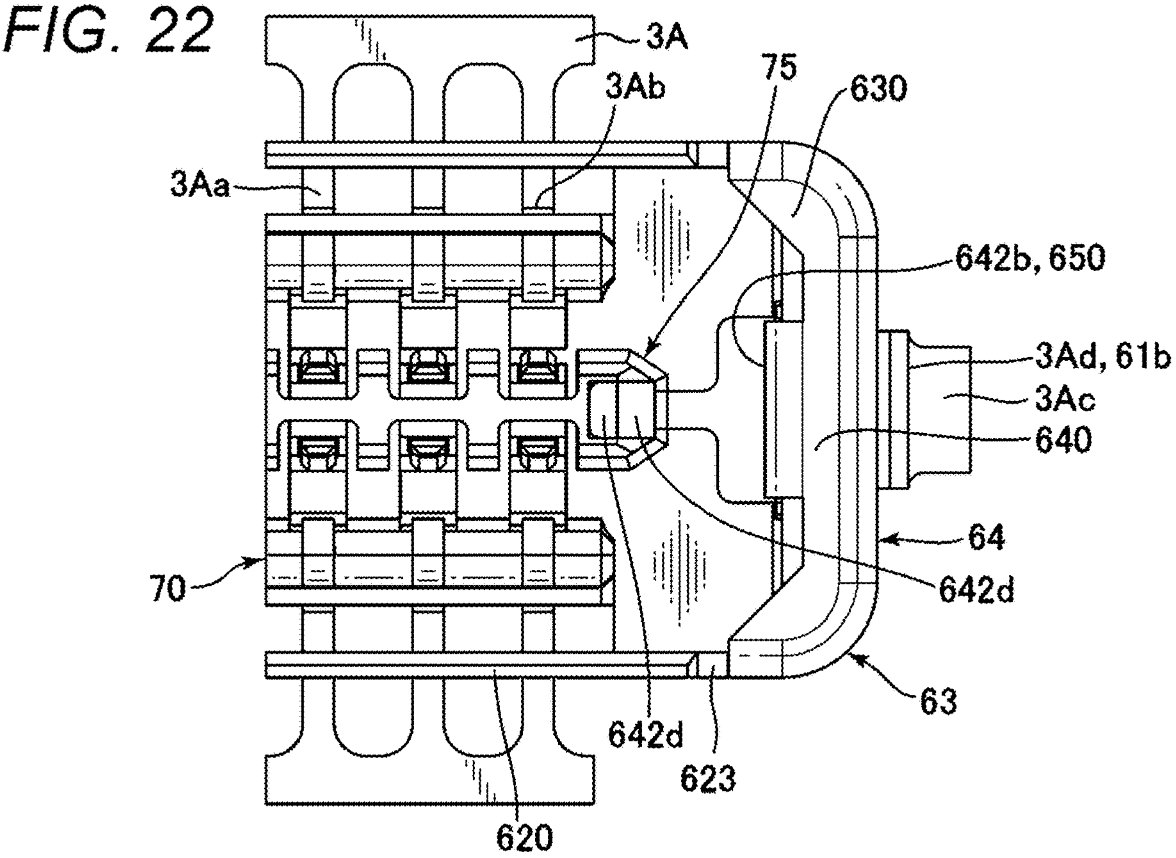
FIG. 22 is a plan view schematically showing the process of manufacturing the receptacle connector by insert molding.

FIGS. 21 and 22 schematically show a process of manufacturing the receptacle connector 5 by insert molding.

As shown in FIG. 21, the receptacle terminals 50 and the receptacle shell 60 are delivered to a predetermined position, at which a mold (not shown) is provided, in a state of the receptacle terminals 50 being supported by strip members 3Aa extending from a carrier 3A and a state of the receptacle shell 60 being supported by a strip member 3Ac extending from the carrier 3A.

The delivered receptacle terminals 50 and receptacle shell 60 are covered with the mold, and thereafter, resin is injected into the mold and resin to be formed as the receptacle housing 70 is solidified. FIG. 22 shows a state immediately after the mold has been removed after the receptacle housing 70 had been fixed to the receptacle terminals 50 and the receptacle shell 60.

Thereafter, the strip members 3Aa, 3Ac of the carrier 3A are cut at predetermined cutting locations 3Ab, 3Ad, and the carrier 3A is cut at a predetermined cutting location. Then, the receptacle connector 5 is completed. Part 61*b* of the strip member 3Ac at the cutting location 3Ad remains, even after cutting, as part of the receptacle shell 60 in a state of being exposed to the outside of the receptacle connector 5. The part 61*b* of the strip member 3Ac can be effectively used as part of the board mounting portion of the receptacle connector 5.

As clearly seen from the above-described manufacturing process, the receptacle housing 70 is provided in close contact with the inner peripheral surface 61*a* of the receptacle shell 60 and the receptacle terminals 50 after completion of the receptacle connector 5. Needless to say, the receptacle housing 70 has a shape corresponding to the inner peripheral surface 61*a* of the receptacle shell 60 at a portion closely contacting the inner peripheral surface 61*a* of the receptacle shell 60. Moreover, the receptacle housing 70 has a shape determined by a relationship with the receptacle terminal 50 at a position closely contacting the receptacle terminal 50.

For example, the receptacle housing 70 includes the center island 75 at the center of the receptacle connector 5. Further, the receptacle housing 70 includes the terminal holding portions 760 holding the receptacle terminals 50 at positions sandwiching the center island 75 in the width direction (γ). Further, the terminal holding portion 760 includes the terminal inner resin 760*a* filling the inside of the receptacle terminals 50 and the inter-terminal resin 760*b* arranged between the receptacle terminals 50. The center island 75 is provided with recessed portions 751 which particularly correspond to the standing portions 642*c* and the cover portions 642*d* forming the inner wall portions 642 of the width-direction portions 64 of the receptacle shell 60.

The receptacle housing 70 has a peripheral wall 71 corresponding to the peripheral wall 61 of the receptacle shell 60. As in the peripheral wall 61 of the receptacle shell 60, the peripheral wall 71 includes a pair of width-direction portions 74 extending in the width direction (γ) at both ends in the length direction (β), length-direction portions 72 (721), and four curved corner portions 73 connecting the width-direction portions 74 to each other and curved in the circumferential direction.

Note that the peripheral wall 71 of the receptacle housing 70 is configured such that portions extending along the length direction (β) and corresponding to the pair of length-direction portions 72 only have end portions 721 positioned closer to the ends in the length direction (β) and have no portions corresponding to center portions 720 positioned closer to the center. In other words, the inner peripheral surface 61*a* of the peripheral wall 61 corresponding to the area where the receptacle terminals 50 are arrayed in the length direction (β) is provided with no receptacle housing 70. As described above, it is configured such that the receptacle housing 70 is not partially provided, and therefore, the connector assembly can be reduced in size particularly in the width direction (γ).

The width-direction portion 74 includes resin 740. The resin 740 fills a space (sectional space) of the receptacle shell 60 formed by the outer wall portion 641, the inner wall portion 642, and the top portion 640 forming the width-direction portion 64 of the receptacle shell 60. By insert molding, substantially all the sectional spaces of the receptacle shell 60 are filled with the resin 740. The resin 740 can enhance the strength of the width-direction portion 64 of the receptacle shell 60 on which great force tends to be applied upon fitting of the plug connector 2 and the receptacle connector 5, and can effectively prevent damage of the plug connector 2.

The curved corner portion 73 includes resin 730. The resin 730 fills a space (sectional space) formed by the body portion 631*a* and the curved portion 631*b* forming the curved corner portion 63 of the receptacle shell 60 and the corner top portion 630 formed together with the length-direction portion 62.

Figure 23:
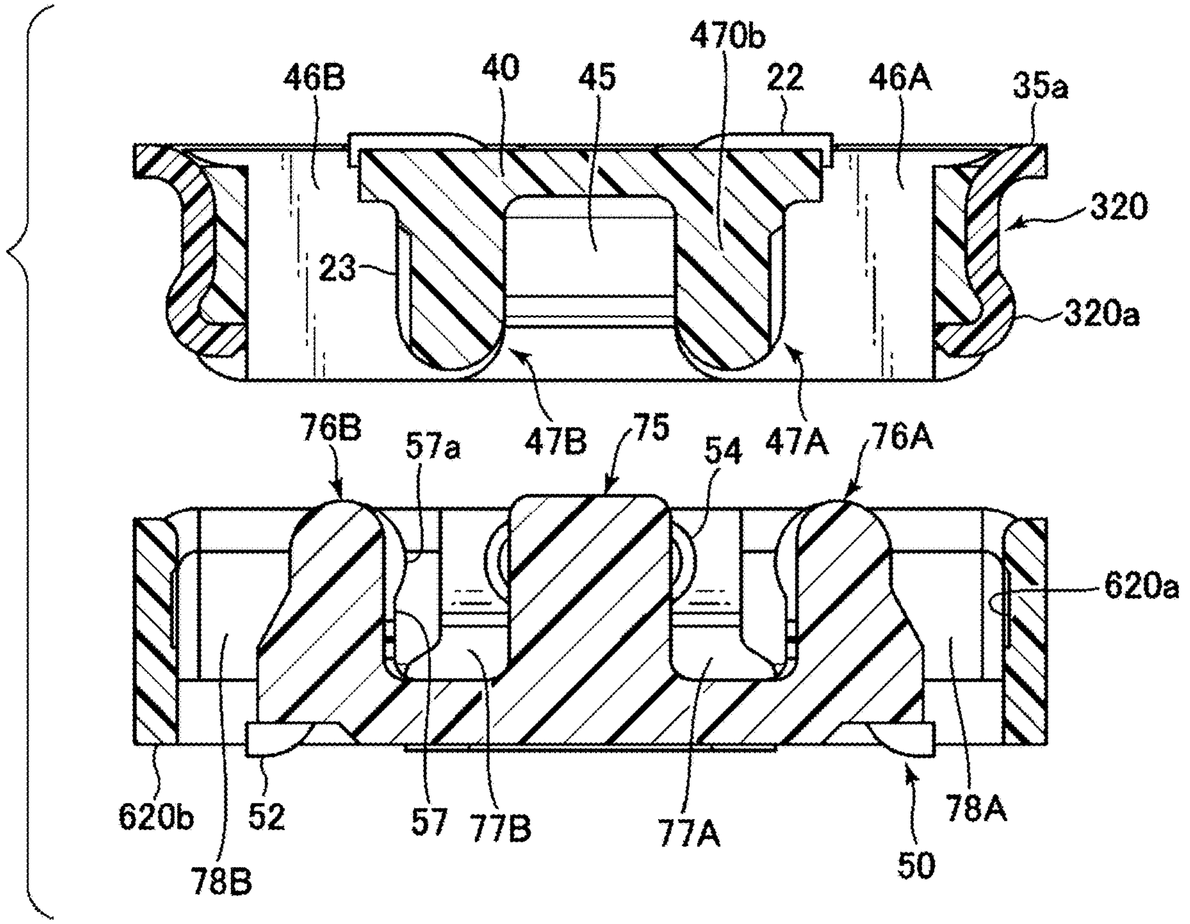
FIG. 23 is a sectional view showing a combination of FIGS. 7 and 17 in a state before fitting.
Figure 24:
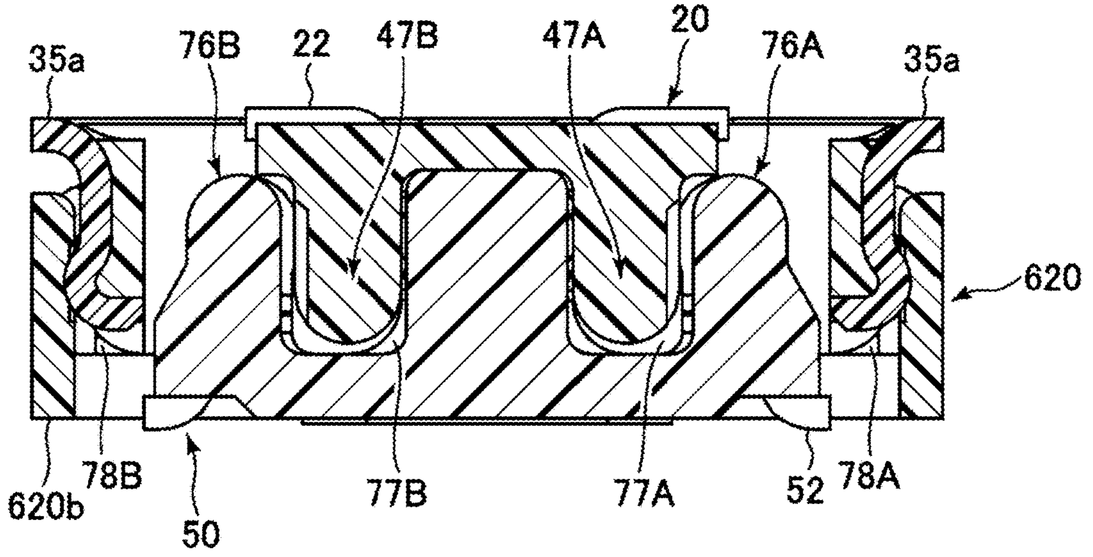
FIG. 24 is a sectional view showing a combination of FIGS. 7 and 17 in a state after fitting.
Figure 25:
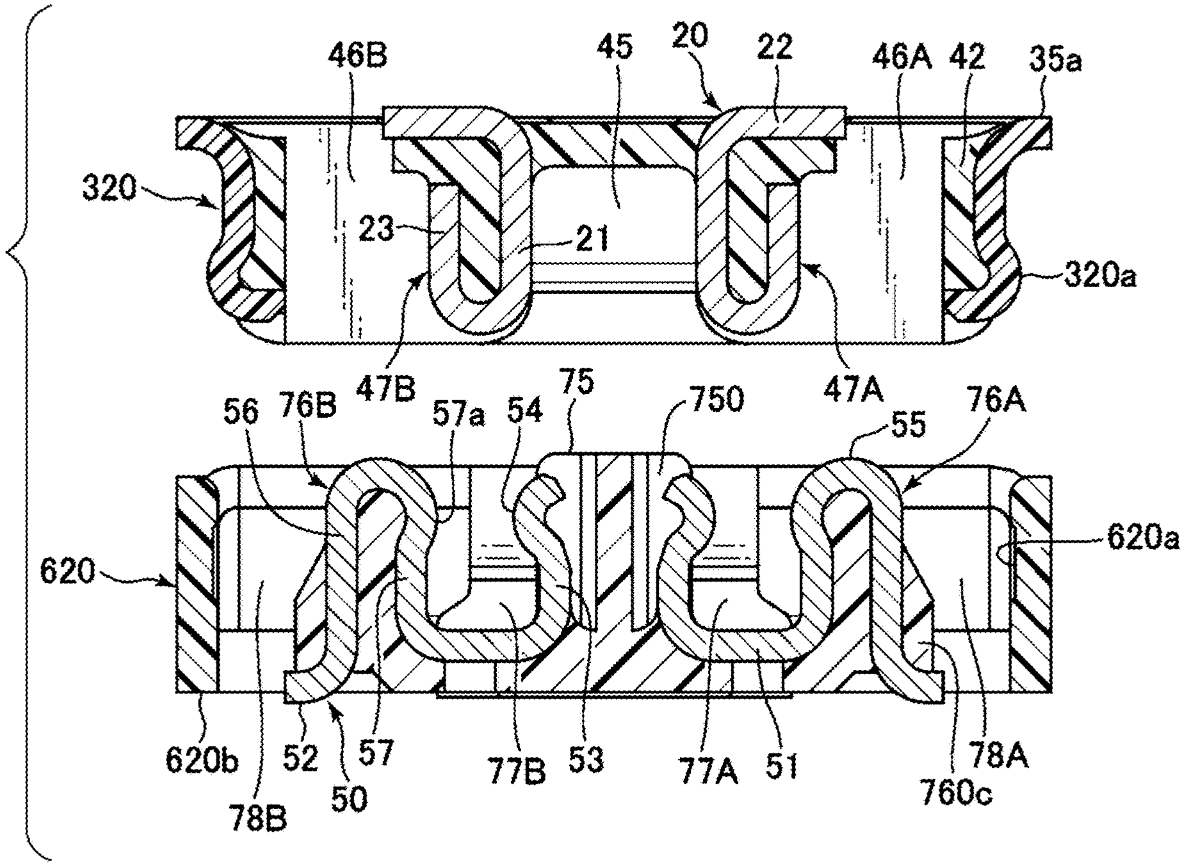
FIG. 25 is a sectional view showing a combination of FIGS. 10 and 20 in a state before fitting.
Figure 26:
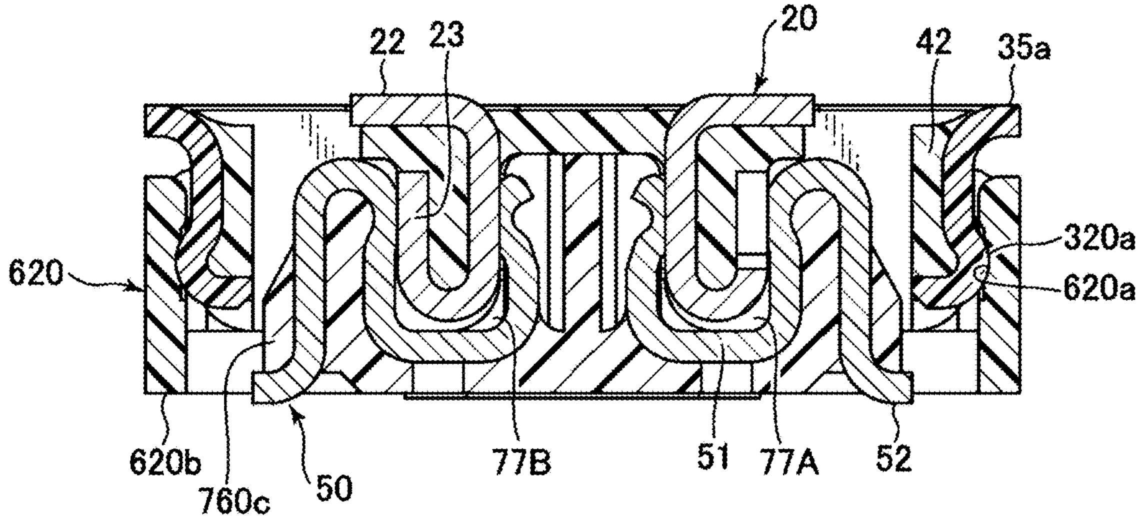
FIG. 26 is a sectional view showing a combination of FIGS. 10 and 20 in a state after fitting.

The state of fitting of the plug connector 2 and the receptacle connector 5, particularly the state of fitting in the "α-γ plane" in the vicinity of the center in the length direction (β), will be described with reference to sectional views of FIGS. 23 to 26. FIG. 23 is a view showing a combination of FIGS. 7 and 17 in a state before fitting. FIG. 24 is a view showing a combination of FIGS. 7 and 17 in a state after fitting. FIG. 25 is a view showing a combination of FIGS. 10 and 20 in a state before fitting. FIG. 26 is a view showing a combination of FIGS. 10 and 20 in a state after fitting.

When the plug connector 2 and the receptacle connector 5 are fitted in each other, the center island 75 (first raised portion) of the receptacle connector 5 is fitted in the first recessed portion 45 of the plug connector 2. The pair of terminal array portions 47A, 47B of the plug connector 2 is fitted in the pair of first recessed portions 77A, 77B of the receptacle connector 5, respectively. The pair of terminal array portions 76A, 76B of the receptacle connector 5 is fitted in the pair of second recessed portions 46A, 46B of the plug connector 2, respectively. The pair of opposing portions of the peripheral wall 31 of the plug shell 30 of the plug connector 2 etc. are fitted in the pair of second recessed portions 78A, 78B of the receptacle connector 5.

As a result of the above-described configuration, the base portion 21 of the plug terminal 20 elastically contacts the elastic contact 54 provided at the elastic contact portion 53 of the receptacle terminal 50, the contact portion 23 of the plug terminal 20 contacts the fixed contact portion 57 of the receptacle terminal 50 in a state of the engagement contact 57*a* of the fixed contact portion 57 being engaged with the engagement portion 23*a* of the contact portion 23, and the center portion 320 of the length-direction portion 32 of the plug shell 30 contacts the center portion 620 of the length-direction portion 62 of the receptacle shell 60 in a state of the locking protruding portion 320*a* of the center portion 320 being locked to the locking portion 620*a* of the center portion 620.

Note that in this state, part (length-direction portion 42) of the plug housing 40 closely contacting the inner peripheral surface 31*a* of the peripheral wall 31 of the plug shell 30 is also fitted in the second recessed portions 78A, 78B, respectively. Thus, due to the functions of the fitted part of the plug housing 40 and the resin 760*c* covering the surface of the fixed leg portion 56 of the receptacle terminal 50, the plug terminals 20 and the receptacle terminals 50 for signal transmission and the plug shell 30 and the receptacle shell 60 for a ground function are completely electrically separated from each other.

As shown in FIGS. 24 and 26, in the present embodiment, the board mounting portion 620*b* of the receptacle shell 60 is formed using the fracture surface of the receptacle shell 60 at the end surface of the receptacle shell 60 linearly extending along the fitting direction (α). Thus, in the plug shell 30 to be fitted in the receptacle shell 60, a great mounting surface for the board can be ensured using the board mounting portion 35 expanded outward. On the other hand, the connector assembly can be reduced in size particularly in the width direction (γ).

The inner peripheral surface 61*a* of the center portion 620 of the receptacle shell 60 is not provided with the receptacle housing 70, and therefore, the plug shell 30 can be fitted in the receptacle shell 60 with relatively-small force. On the other hand, the plug housing 40 closely contacts the inner peripheral surface 31*a* of the center portion 320 of the plug shell 30, and therefore, sufficient strength can be ensured over the entire connector assembly including the plug connector 2 and the receptacle connector 5 combined with each other.

Description above relates to the preferred embodiment, and shall be understood merely as a representative of an article and a method for manufacturing the article. It can be acknowledged that modifications and corrections of different embodiments are apparent for those skilled in the art in the light of the above-described teaching. Thus, exemplary embodiments and representative embodiments can be made without departing from the spirit of the article and method of the present disclosure.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A connector assembly comprising:

a first connector; and a second connector fittable in the first connector, wherein the first connector has a plurality of first terminals, a conductive first shell, and an insulating first housing, the plurality of first terminals is arrayed along a length direction of the connector assembly, the first shell has a first peripheral wall surrounding the plurality of first terminals, the first housing holds the plurality of first terminals and the first shell, the second connector has a plurality of second terminals, a conductive second shell, and an insulating second housing, the plurality of second terminals is arrayed along the length direction, the second shell has a second peripheral wall surrounding the plurality of second terminals, the second housing holds the plurality of second terminals and the second shell, the first housing is formed integrally with the plurality of first terminals and the first shell, the second housing is formed integrally with the plurality of second terminals and the second shell, and at least any one of the first peripheral wall or the second peripheral wall has a jointless structure over an entire circumference.

2. The connector assembly according to claim 1, wherein upon fitting of the first connector and the second connector, the first shell is fitted in the second shell.

3. The connector assembly according to claim 1, wherein the first shell has a board mounting portion, and the board mounting portion of the first shell is provided over an entire circumference of the first shell so as to extend from an end portion of the first peripheral wall on a side opposite to a side of fitting in the second connector to an outside of the first connector.

4. The connector assembly according to claim 1, wherein the first housing is provided in close contact with at least an inner peripheral surface of the first peripheral wall along the length direction.

5. The connector assembly according to claim 1, wherein the first shell has a board mounting portion, each of the plurality of first terminals has a board mounting portion, and at least any one of the board mounting portions of the plurality of first terminals protrudes to a side opposite to a side of fitting in the second connector with respect to the board mounting portion of the first shell.

6. The connector assembly according to claim 1, wherein at least any one of part of the first shell or part of the first housing positioned at an end portion of the first connector in the length direction protrudes to a side of fitting in the second connector with respect to a center portion of the first shell positioned at a center of the first connector in the length direction.

7. The connector assembly according to claim 1, wherein the first shell has a width-direction portion, the width-direction portion is provided at an end portion of the first shell in the length direction, and extends in a width direction of the connector assembly, the width-direction portion includes an outer wall portion, an inner wall portion, and a top portion, the outer wall portion forms an outermost wall portion of the first peripheral wall in the length direction, the inner wall portion is positioned inside the outer wall portion in the length direction, the top portion is positioned between the outer wall portion and the inner wall portion, and is positioned at an endmost of the first shell on a side of fitting in the second connector, and a space formed by the outer wall portion, the inner wall portion, and the top portion is filled with resin forming the first housing.

8. The connector assembly according to claim 7, wherein the inner wall portion has a board mounting portion.

9. The connector assembly according to claim 1, wherein upon fitting of the first connector and the second connector, the second shell is fitted onto the first shell.

10. The connector assembly according to claim 9, wherein upon fitting of the first connector and the second connector, surfaces of the plurality of second terminals facing the first shell are covered with resin.

11. The connector assembly according to claim 1, wherein the second shell has a board mounting portion, and the board mounting portion of the second shell is provided at an end surface of the second shell on a side opposite to a side of fitting in the first connector.

12. The connector assembly according to claim 1, wherein the second housing is not provided at least at an inner peripheral surface of the second peripheral wall corresponding to an area where the plurality of second terminals is arrayed in the length direction.

13. The connector assembly according to claim 1, wherein each of the plurality of second terminals has a board mounting portion, the second shell has a board mounting portion, and at least any one of the board mounting portions of the plurality of second terminals protrudes to a side opposite to a side of fitting in the first connector with respect to the board mounting portion of the second shell.

14. The connector assembly according to claim 1, wherein an end portion of the second shell positioned at an end portion of the second connector in the length direction protrudes to a side of fitting in the first connector with respect to a center portion of the second shell positioned at a center of the second connector in the length direction.

15. The connector assembly according to claim 1, wherein the second shell has a width-direction portion, the width-direction portion is provided at an end portion of the second shell in the length direction, and extends in a width direction of the connector assembly, the width-direction portion includes an outer wall portion, an inner wall portion, and a top portion, the outer wall portion forms an outermost wall portion of the second peripheral wall in the length direction, the inner wall portion is positioned inside the second connector with respect to the outer wall portion in the length direction, the top portion is positioned between the outer wall portion and the inner wall portion, and is positioned at an endmost of the second shell on a side of fitting in the first connector, and a space formed by the outer wall portion, the inner wall portion, and the top portion is filled with resin forming the second housing.

16. The connector assembly according to claim 15, wherein the inner wall portion has a board mounting portion.

17. The connector assembly according to claim 15, wherein the second housing further has a first raised portion, and the first raised portion extends in the length direction and is provided in an island shape at a center of the second housing in the width direction, the inner wall portion of the second shell has a base portion, a locking portion, a standing portion, and a cover portion, and together with the second housing, forms a receiving portion for receiving an end portion of the first connector in the length direction, the base portion forms a bottom portion of the inner wall portion, the locking portion stands to the side of fitting in the first connector at one end of the base portion positioned on an outer end side of the second connector in the length direction, the standing portion stands to the side of fitting in the first connector so as to cover an end portion of the first raised portion in the length direction at the other end of the base portion positioned on an inner end side of the second connector in the length direction, and the cover portion extends from the standing portion to cover part of a top surface of the first raised portion.

18. The connector assembly according to claim 1, wherein the first housing has a first recessed portion, a first raised portion, and a second recessed portion extending in the length direction of the connector assembly, and the first raised portion and the second recessed portion are provided on each side of the first recessed portion in a width direction of the connector assembly, the first recessed portion of the first housing is provided between the first raised portions of the first housing in the width direction, the second recessed portion of the first housing is provided between the first raised portion of the first housing and the first peripheral wall of the first shell in the width direction, the second housing has a first raised portion, a first recessed portion, a second raised portion, and a second recessed portion extending in the length direction, and the first recessed portion, the second raised portion, and the second recessed portion are provided on each side of the first raised portion in the width direction, the first recessed portion of the second housing is provided between the first raised portion of the second housing and the second raised portion of the second housing in the width direction, the second recessed portion of the second housing is provided between the second raised portion of the second housing and the second peripheral wall of the second shell in the width direction, the first raised portion of the first housing holds the first terminals, and the second raised portion of the second housing holds the second terminals, and the first raised portion of the second housing is fitted in the first recessed portion of the first housing, the first raised portion of the first housing is fitted in the first recessed portion of the second housing, the second raised portion of the second housing is fitted in the second recessed portion of the first housing, and the first peripheral wall of the first shell is fitted in the second recessed portion of the second housing.

19. The connector assembly according to claim 18, wherein at least any one of part of the first shell or part of the first housing positioned at an end portion of the first connector in the length direction protrudes to a side of fitting in the second connector with respect to the first raised portion of the first housing.

20. The connector assembly according to claim 18, wherein at least any one of the first raised portion or the second raised portion of the second housing protrudes to a side of fitting in the first connector with respect to the second shell.

* * * * *